United States Patent
Kim et al.

(10) Patent No.: US 11,966,735 B2
(45) Date of Patent: Apr. 23, 2024

(54) SYSTEM AND METHOD OF RESOURCE MANAGEMENT AND PERFORMANCE PREDICTION OF COMPUTING RESOURCES

(71) Applicant: COUPA SOFTWARE INCORPORATED, San Mateo, CA (US)

(72) Inventors: Jason Kim, San Francisco, CA (US); Srini Konakanchi, San Mateo, CA (US); Mayank Mathur, San Mateo, CA (US)

(73) Assignee: Coupa Software Incorporated, San Mateo, CA (US)

(*) Notice: Subject to any disclaimer, the term of this patent is extended or adjusted under 35 U.S.C. 154(b) by 0 days.

(21) Appl. No.: 18/299,771

(22) Filed: Apr. 13, 2023

(65) Prior Publication Data
US 2023/0251860 A1    Aug. 10, 2023

Related U.S. Application Data

(63) Continuation of application No. 17/682,905, filed on Feb. 28, 2022, now Pat. No. 11,662,999, which is a continuation of application No. 17/163,062, filed on Jan. 29, 2021, now Pat. No. 11,269,627.

(51) Int. Cl.
  *G06F 8/77* (2018.01)
  *G06F 9/50* (2006.01)
  *G06F 11/34* (2006.01)

(52) U.S. Cl.
  CPC .............. *G06F 8/77* (2013.01); *G06F 9/5055* (2013.01); *G06F 11/3409* (2013.01); *G06F 11/3457* (2013.01); *G06F 2209/508* (2013.01)

(58) Field of Classification Search
  None
  See application file for complete search history.

(56) References Cited

U.S. PATENT DOCUMENTS

| | | |
|---|---|---|
| 8,620,921 B1 | 12/2013 | Susarla et al. |
| 9,870,296 B1 | 1/2018 | Parenti et al. |
| 10,025,718 B1 | 7/2018 | Wasiq et al. |
| 2004/0064293 A1 | 4/2004 | Hamilton et al. |
| 2010/0070441 A1 | 3/2010 | Yuta |
| 2010/0192158 A1 | 7/2010 | Gaither et al. |
| 2017/0329660 A1 | 11/2017 | Salunke et al. |

*Primary Examiner* — Qing Chen
(74) *Attorney, Agent, or Firm* — Baker Botts L.L.P.

(57) ABSTRACT

In one or more embodiments, a system and/or a method may implement: receiving data representing different performance behavior metrics that are associated with software instances that are respectively associated with consumer computers and that specify values of performance factors of the software instances as the consumer computers interoperate with the software instances; determining data throughput values that represent processing throughput of the software instances; determining relative capacity values of the software instances; adapting each of prediction models to the relative capacity values; determining correlation coefficients from the prediction models and the multiple data throughput values; executing a prediction model of the prediction models associated with a correlation coefficient closest to a value of "1" to result in outputting threshold values associated with the performance factors; and transmitting the threshold values to a particular consumer computer among the consumer computers as part of a change recommendation message having a hyperlink.

19 Claims, 13 Drawing Sheets

SYSTEM AND METHOD OF RESOURCE MANAGEMENT AND PERFORMANCE PREDICTION OF COMPUTING RESOURCES

BENEFIT CLAIM

This application claims the benefit under 35 U.S.C. § 120 as a continuation of application Ser. No. 17/682,905, filed Feb. 28, 2022, now U.S. Pat. No. 11,662,999, which is a continuation of application Ser. No. 17/163,062 filed Jan. 29, 2021, now U.S. Pat. No. 11,269,627, the entire contents of which is hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Coupa Software Incorporated.

TECHNICAL FIELD

One technical field of the disclosure is computer-implemented methods of measuring the performance of computing resources. Another technical field is measuring performance factors that affect the response times of computing resources.

DESCRIPTION OF THE RELATED ART

Computing instances can be utilized to process data. In the field of e-procurement or spend management systems, online, distributed computer systems are now available to deliver software as a service (SaaS) for executing sourcing, invoicing, expense management, and other data processing functions that relate to procurement of goods or services. The data that these systems generate can include various performance factors, which can affect response times of the computing instances. For example, in spend management systems, configuration values such as the number of approval chain conditions in total per record type can have a significant effect on system performance.

While adding additional computing resources, such as more processing instances, memory, or storage, can decrease response times of the computing instances, at some point there can be diminishing returns of adding additional computing resources. For example, continually adding resources eventually may lead to excessive costs. Moreover, based on various performance factors, adding additional performance factors can even increase response times of the computing instances. Therefore, there is an acute need in the field for technical means to measure various performance factors of SaaS systems, report system state, warn if prescribed threshold values are crossed, and predict future system state. Present technologies do not provide adequate solutions to these technical problems.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
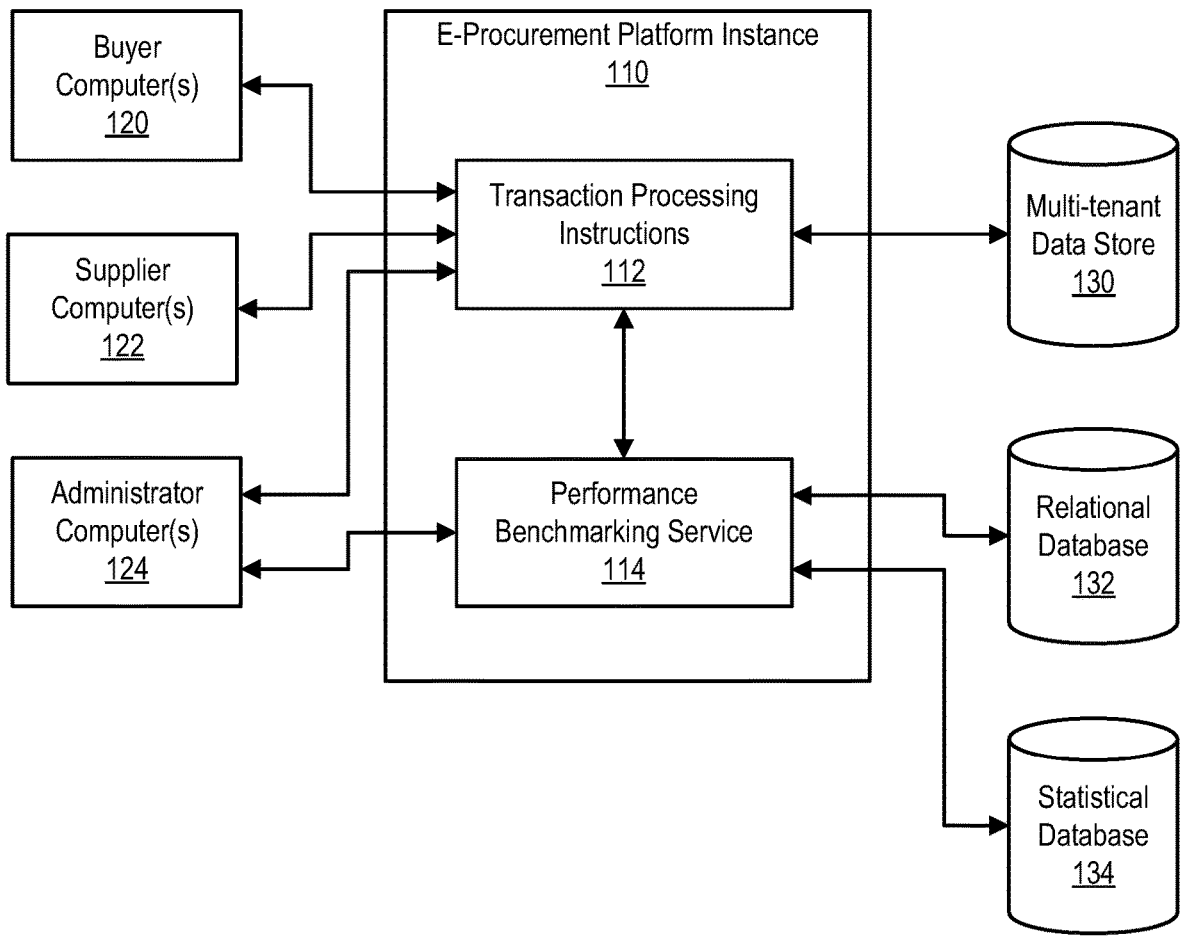
FIG. 1A illustrates an example of a procurement platform instance, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general. Hyphenated pairs of reference numerals, such as "102-120," include all reference numerals that are within or between the specified pair values.

Embodiments are described in sections herein according to the following outline:
   1. General Overview
   2. System Overview
   3. Framework Overview
   4. Graphical User Interface Overview
   5. Method Overview
   6. Computer System Overview

1. General Overview

In one or more embodiments, a data processing system, a method, and/or a computer program may be implemented in a computer system such as an e-procurement computer system, spend management system, or e-procurement platform instance implemented in a computer program that executes on a computer system.

In one or more embodiments, a data processing system, a method, and/or a computer program may implement the combination of: programmatically receiving digital data representing multiple different performance behavior metrics that are associated with software instances that are respectively associated with multiple consumer computers and that specify values of performance factors of the software instances as the consumer computers interoperate with the software instances; determining, based at least on the performance behavior metrics, multiple data throughput values that represent processing throughput of the software instances as the consumer computers interoperate with the software instances; determining, based at least on the multiple data throughput values, relative capacity values of the software instances; adapting each machine learning prediction model of multiple machine learning prediction models to the relative capacity values of the software instances; determining multiple correlation coefficients from the multiple machine learning prediction models and the multiple data throughput values; determining a correlation coefficient of the multiple correlation coefficients that is closest to a value of "1"; executing a prediction model of the prediction models associated with the correlation coefficient to result in outputting threshold values associated with the performance factors; and transmitting the threshold values to a particular consumer computer among the multiple consumer computers as part of a change recommendation message having a hyperlink which, when selected, causes automatically modifying an attribute of a particular software instance that is associated with the particular consumer computer, the attribute being associated with a particular performance factor among the performance factors.

In one or more embodiments, transmitting the threshold values to the particular consumer computer may include transmitting instructions for a selection graphical user element that permits modifying the attribute of the particular software instance that is associated with the particular consumer computer. In one or more embodiments, the multiple prediction models may include one or more of an Amdahl prediction model that is programmed to execute a first simulation to evaluate a first effect of the performance factors on the software instances, a Gustafson prediction model that is programmed to execute a second simulation to evaluate a second effect of the performance factors on the software instances, and a universal scalability prediction model that is programmed to execute a third simulation to evaluate a third effect of the performance factors on the software instances. In one or more embodiments, the performance factors may include one or more of an approval chain, an account groups count, an account count, an approval chain conditions count, and a maximum account validation rule count for a single chart of accounts.

In one or more embodiments, the data processing system, the method, and/or the computer program may further implement one or more of: receiving, from a particular consumer computer of the multiple consumer computers, input that indicates a change in a particular factor of the factors that affect the performance behavior metrics; executing the prediction model of the prediction models associated with the correlation coefficient to result in outputting new threshold values associated with the factors that affect the performance behavior metrics; and repeating the transmitting using the new threshold values.

In one or more embodiments, the data processing system, the method, and/or the computer program may further implement one or more of: receiving, from a particular consumer computer of the multiple consumer computers, input that indicates a change in at least one factor of the factors that affect the performance behavior metrics; executing the prediction model of the prediction models associated with the correlation coefficient to result in outputting a percentage change of a response time of a transaction based at least on the change in the at least one factor of the factors that affect the performance behavior metrics; and repeating the transmitting using the percentage change of a response time of a transaction.

In one or more embodiments, the software instances are executed via at least one of a virtual machine and a container, among others.

In one or more embodiments, a performance benchmark service may include one or more resource management tools and/or one or more performance prediction tools, among others. For example, the performance benchmark service may monitor one or more configurations for computers, accounts, or entities comprising multiple computers or accounts, such as entities that are related to a provider of the service as customers. For instance, based at least on predicted thresholds associated with the one or more configurations, the performance benchmark service may provide a customer a current state of response times of one or more computing instances, may warn if one or more prescribed thresholds are exceeded, and/or may project one or more future states of the response times of the one or more computing instances. As an example, one or more models utilized by the performance benchmark service. For instance, the one or more models may recommend that a customer configure no more than a specific number of approval chain conditions per record type to maintain system performance according to a metric. As another example, the performance benchmark service may determine a model from multiple models based at least on previous response times. For instance, the determined model may recommend that a customer configure no more than a specific number of approval chain conditions per record type to maintain system performance according to a metric. While the term "customer" is used for convenience herein to refer to one example of entities that may contribute data or receive data or reports from embodiments, a customer relationship to a service provider is not required; for example, a computer, distributed system, account, or other entity may implement the techniques of this disclosure for itself.

In one or more embodiments, the performance benchmark service may forecast and/or may recommend one or more optimal administrative configuration thresholds to customers that may be utilized with their respective computer systems and/or e-procurement platform instances. For example, the performance benchmark service may apply one or more customer configuration profiles and/or resulting system performance outcomes of a computing instance towards a computational model to determine the one or more optimal administrative configuration thresholds. For instance, the customer may utilize the one or more optimal administrative configuration thresholds to configure their respective computing instances (e.g., e-procurement platform instances, software instances, etc.) to run in performant fashion.

In one or more embodiments, a model may update the one or more thresholds based at least on changing conditions of a computing infrastructure and/or based at least on behaviors of the computing infrastructure associated with one or more configurations of one or more customers. For example, a computing infrastructure may include one or more computer systems and instructions executed by the one or more computer systems.

In one or more embodiments, based at least on multiple configurations of multiple customers, the performance benchmark service may provide a new customer with one or more optimal administrative configuration thresholds based on previous response times of computing instances associated with other customers. As utilized computing resources of the new customer grows in capability and/or capacity, the performance benchmark service may continue to provide the new customer with additional one or more optimal administrative configuration thresholds for computing instances associated with the new customer. In one or more embodiments, the performance benchmark service may utilize one or more customer configuration profiles and/or resulting system performance outcomes of the new customer and other existing customers to provide one or more optimal administrative configuration thresholds to all customers. As an example, the performance benchmark service may utilize information from actual customer computer system utilization to provide computing infrastructure capacity planning for all customers.

In one or more embodiments, the performance benchmark service may determine one or more factors that may affect performance of a computing system infrastructure. For example, the one or more factors may include one or more of counts of approval chains, counts of approvers, times of approvers to complete approvals, invoicing tolerances, approval thresholds, counts of account validation rules, and numbers of invoices, requisitions, or purchase orders that are defined in the system, among others. In one or more embodiments, the performance benchmark service may determine one or more metrics to be utilized for a computing model. For example, the one or more metrics may include one or more of throughput and response time (e.g., an average, ninetieth percentile, etc.), among others.

In one or more embodiments, the performance benchmark service may run the one or more metrics through a benchmarking model. After one or more performance values are inserted in the benchmarking model, the one or more performance values may be modified and/or scaled. In one or more embodiments, the performance benchmark service may determine a best model based at least on criteria and multiple statistical tests. In one example, the performance benchmark service may determine one or more coefficients of a polynomial. For instance, the polynomial may be a quadratic equation. In a second example, the performance benchmark service may perform one or more statistical significance tests (e.g., p-values). In another example, the performance benchmark service may perform a k-fold cross validation. For instance, the performance benchmark service may utilize a resampling process to evaluate the one or more coefficients of the polynomial. As an example, the performance benchmark service may utilize a resampling process to evaluate the one or more coefficients of the polynomial based at least on the one or more performance values.

2. System Overview

FIG. 1A illustrates an example of a procurement platform instance, according to one or more embodiments. As shown, an e-procurement platform instance 110 may include transaction processing instructions 112 and a performance benchmarking service 114. The transaction processing instructions 112 and performance benchmark service 114 each comprise one or more sequences of stored program instructions that are executable by a processor of a computer system.

In one or more embodiments, platform instance 110 may executed via one or more of a computer system, a virtual machine, and a container (e.g., operating system virtualization), among others. One or more virtual computing instances in public or private datacenters may be used. As illustrated, buyer computer(s) 120 may be communicatively coupled to transaction processing instructions 112. For example, buyer computer(s) 120 may be communicatively coupled to transaction processing instructions 112 via a network. For instance, buyer computer(s) 120 and transaction processing instructions 112 may communicate data.

As shown, supplier computer(s) 122 may be communicatively coupled to transaction processing instructions 112. For example, supplier computer(s) 122 may be communicatively coupled to transaction processing instructions 112 via a network. For instance, supplier computer(s) 122 and transaction processing instructions 112 may communicate data. As illustrated, administrator computer(s) 124 may be communicatively coupled to transaction processing instructions 112. For example, administrator computer(s) 124 may be communicatively coupled to transaction processing instructions 112 via a network. For instance, administrator computer(s) 124 and transaction processing instructions 112 may communicate data.

As shown, a multi-tenant data store 130 may be communicatively coupled to transaction processing instructions 112. For example, multi-tenant data store 130 may be communicatively coupled to transaction processing instructions 112 via a network. For instance, multi-tenant data store 130 and transaction processing instructions 112 may communicate data. As illustrated, a relational database 132 may be communicatively coupled to performance benchmark service 114. For example, relational database 132 may be communicatively coupled to performance benchmark service 114 via a network. For instance, relational database 132 and performance benchmark service 114 may communicate data. As shown, a statistical database 134 may be communicatively coupled to performance benchmark service 114. For example, statistical database 134 may be communicatively coupled to performance benchmark service 114 via a network. For instance, statistical database 134 and performance benchmark service 114 may communicate data. In one or more embodiments, statistical database 134 may store response times of one or more computing instances. For example, statistical database 134 may store response times of one or more e-procurement platform instances.

Figure 1B:
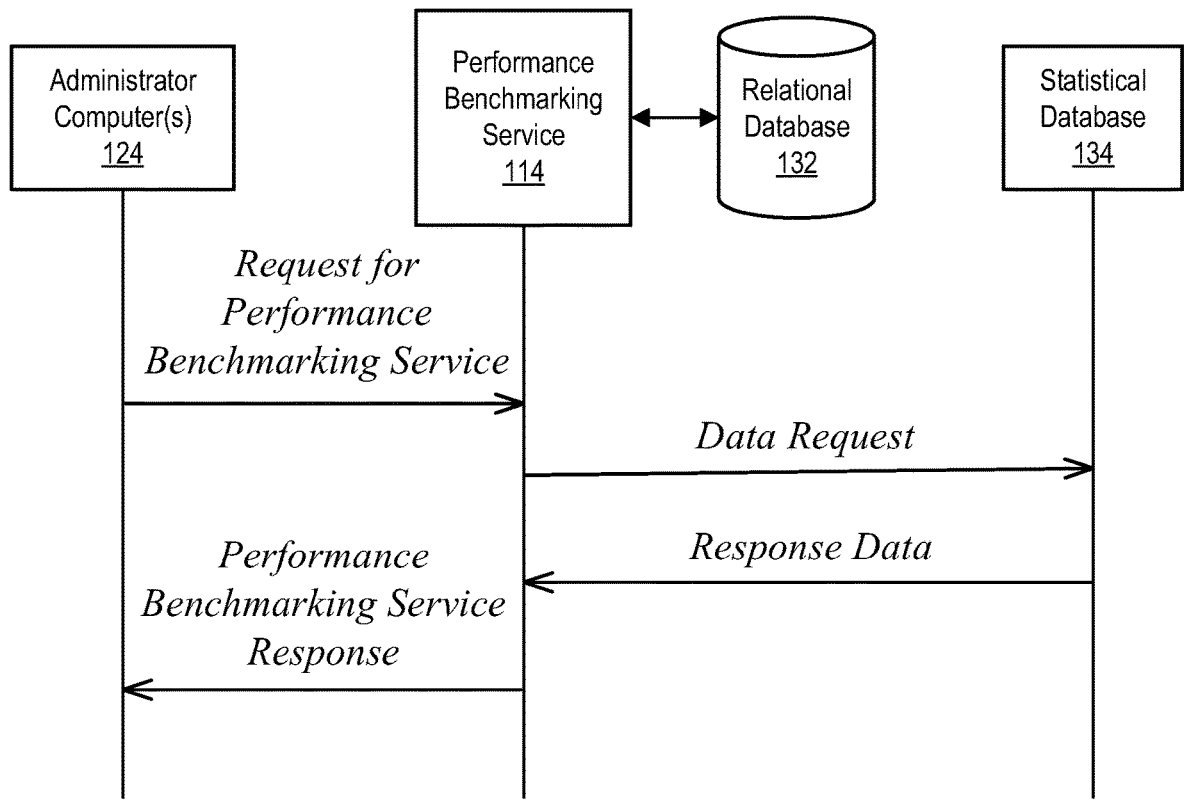
FIG. 1B illustrates an example of a sequence diagram, according to one or more embodiments.

FIG. 1B illustrates an example of a sequence diagram, according to one or more embodiments. In the example of FIG. 1B, a user (e.g., an administrator) may utilize an administrator computer 124 to provide a request for performance benchmark service from performance benchmark service 114. For example, the request for performance benchmark service may include a request to determine a performance impact of one or more attributes of a specific transaction.

In one or more embodiments, statistical database 134 may provide response data to performance benchmark service 114. For example, performance benchmark service 114 may receive the response data from statistical database 134. In one or more embodiments, performance benchmark service 114 may utilize the response data from statistical database 134 to determine a predictor model of multiple predictor models.

In one or more embodiments, performance benchmark service 114 may provide a data request to statistical database 134. For example, statistical database 134 may receive the data request from performance benchmark service 114. As illustrated, administrator computer(s) 124 may provide a request for performance benchmark service from performance benchmark service 114. For example, performance benchmark service 114 may receive the request for the performance benchmark service from administrator computer(s) 124.

In one or more embodiments, performance benchmark service 114 may utilize the determined predictor model to determine a performance benchmark service response based at least on the request to determine the performance impact of the one or more attributes of the specific transaction. For example, performance benchmark service 114 may utilize the determined predictor model to determine the performance impact of the one or more attributes of the specific transaction.

In one or more embodiments, performance benchmark service 114 may provide at least a portion of a graphical user interface, one or more graphics, and/or instructions for the graphical user interface that indicates the performance impact of the one or more attributes of the specific transaction to the user (e.g., the administrator) via the administrator computer 124 associated with the user. In one example, the graphical user interface may include a web browser associated with the administrator computer 124 associated with the user. In another example, the graphical user interface may include a portion of a web browser associated with the administrator computer 124 associated with the user. In one or more embodiments, performance benchmark service 114 may provide a performance benchmark service response to administrator computer(s) 124. For example, administrator computer(s) 124 may receive the performance benchmark service response from performance benchmark service 114.

3. Framework Overview

Figure 2:
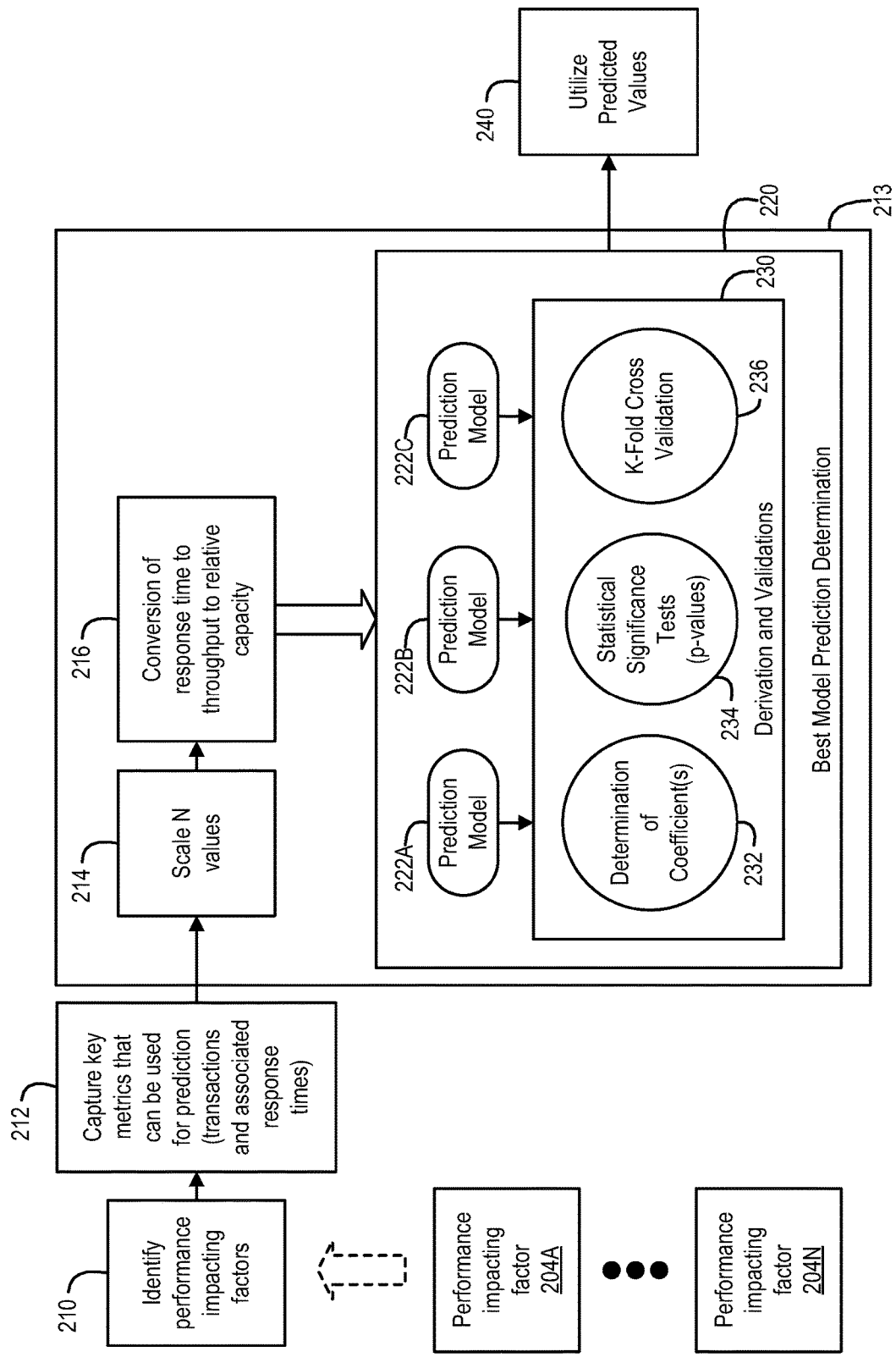
FIG. 2 illustrates an example of a framework that determines a prediction model from multiple prediction models, according to one or more embodiments.

FIG. 2 illustrates an example of a framework that determines a prediction model from multiple prediction models, according to one or more embodiments. "Framework," in this context, refers to functional elements and data flows that cooperate in a distributed computer system, such as the system shown in FIG. 1A, FIG. 1B, to execute the functions that are further described herein.

At 210, performance impacting factors may be identified under control of stored program instructions of FIG. 1A. For example, performance impacting factors 204A-204N may be identified and may relate to a system under monitoring or management, such as an instance of a SaaS-based e-procurement or spend management application. The label "204N," in this example, indicates that any number of factors may be identified. For instance, performance impacting factors may include one or more of an approval chain, an account groups count, an account count, an approval chain conditions count, and a maximum account validation rule count for a single chart of accounts, among others. In one or more embodiments, additional performance impacting factors may be utilized. For example, the additional performance impacting factors may be utilized as additional data that may be provided to a model. Although performance impacting factors 204A-204N are illustrated, any number of performance impacting factors may be identified and/or utilized, according to one or more embodiments. Identifying performance factors at 210 may be implemented using instrumentation code in the monitored or managed system, by inspecting or scanning log files or other system monitor data that is maintained inherently for other purposes, or by polling tables of the monitored or managed system.

At 212, key metrics that can be used for prediction may be captured under stored program control. For example, key metrics that can be used for prediction may be captured from performance impacting factors 204A-204N. Examples include transactions and associated response times. In one or more embodiments, the performance impacting factors that were identified and the key metrics that were captured may be provided to a programmed machine learning model 213, which is implemented using stored program instructions of the system of FIG. 1A, FIG. 1B. For example, model 213 may include one or more processes that may be executed on a computer system.

In one or more embodiments, a process 214 is programmed to scale N values. For example, all values of the performance impacting factors may be divided by a number such that a first value of the performance impacting factors may be "1". For instance, scaling the values of the performance impacting factors may provide a common commencement when the one or more processes of model 213 receive additional data. As an example, values and response times are shown in Table 1, and the values are shown as scaled in Table 2.

TABLE 1

| Factors (N) | Response Times (N) |
|---|---|
| 10000 | 0.75 |
| 150000 | 0.89 |
| 900000 | 1.59 |
| 1000000 | 1.68 |
| 2000000 | 2.62 |
| 3000000 | 3.56 |
| 4000000 | 4.49 |
| 5000000 | 5.43 |
| 7000000 | 7.31 |
| 9000000 | 9.18 |
| 10000000 | 10.22 |
| 12000000 | 12.44 |
| 15000000 | 16.33 |
| 16000000 | 18.88 |
| 16890000 | 19 |

TABLE 2

| Factors (N) | Scaled Factors (N) |
|---|---|
| 10000 | 1 |
| 150000 | 15 |
| 900000 | 90 |
| 1000000 | 100 |
| 2000000 | 200 |
| 3000000 | 300 |
| 4000000 | 400 |
| 5000000 | 500 |
| 7000000 | 700 |
| 9000000 | 900 |
| 10000000 | 1000 |
| 12000000 | 1200 |
| 15000000 | 1500 |
| 16000000 | 1600 |
| 16890000 | 1689 |

In one or more embodiments, values of the performance impacting factors may be from a single customer computing instance associated with a single customer, may be from multiple customer computing instances associated with a single customer, or may be from multiple customer computing instances associated with multiple customers. For example, values of the performance impacting factors from multiple customer computing instances associated with multiple customers may provide better predictions for a single customer computing instance associated with a single customer.

In one or more embodiments, a process 216 may convert one or more response times to throughput to relative capacity. For example, process 216 may utilize a machine repairman model or a modified machine repairman model to convert one or more response times to throughput to relative capacity. For instance, process 216 may convert one or more response times to throughput to relative capacity so that the one or more response times may be utilized with a prediction model 222A, 222B, 222C. As an example, the scaled values, response times, and throughput values, which were determined from the response times, are shown in Table 3. In one or more embodiments, the throughput values may be converted to capacity values. For example, the response times may be converted to throughput values via a machine repairman model. For instance, converting the response times throughput values via a machine repairman model may include determining $X(N)=(N/R(N))-Z$, where $X(N)$ is throughput and $Z$ is a constant. $Z$ may be assumed to be "0", according to one or more embodiments.

TABLE 3

| Scaled Factors (N) | Response Times (N) | Throughput X(N) |
|---|---|---|
| 1 | 0.75 | 1.333333333 |
| 15 | 0.89 | 16.853932580 |
| 90 | 1.59 | 56.603773580 |
| 100 | 1.68 | 59.523809520 |
| 200 | 2.62 | 76.335877860 |
| 300 | 3.56 | 84.269662920 |
| 400 | 4.49 | 89.086859690 |
| 500 | 5.43 | 92.081031310 |
| 700 | 7.31 | 95.759233930 |
| 900 | 9.18 | 98.039215690 |
| 1000 | 10.22 | 97.847358120 |
| 1200 | 12.44 | 96.463022510 |
| 1500 | 16.33 | 91.855480710 |
| 1600 | 18.88 | 84.745762710 |
| 1689 | 19 | 88.894736840 |

Figure 3:
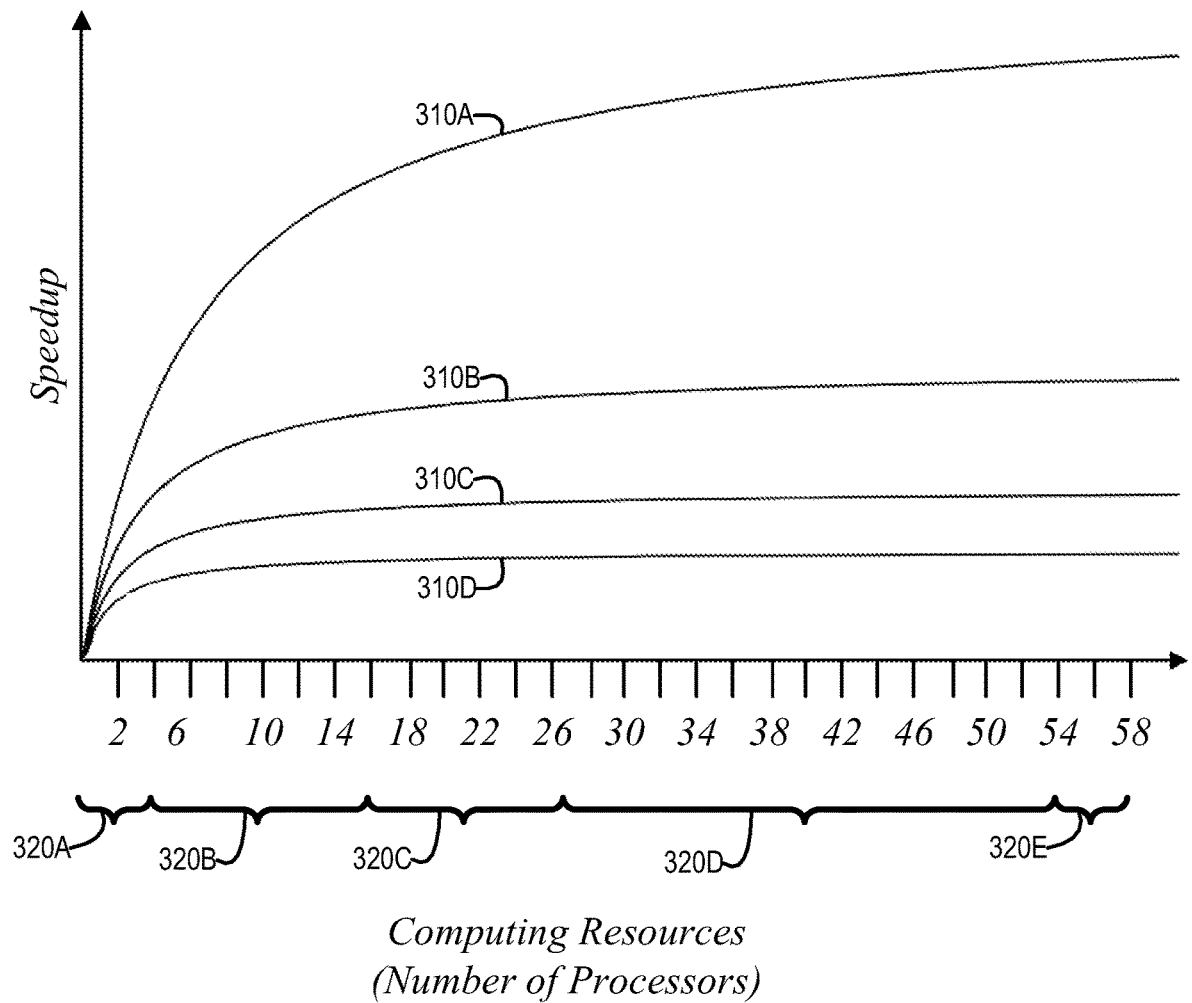
FIG. 3 illustrates an example of a graph that shows speed up versus computing resources, according to one or more embodiments.

In one or more embodiments, $X(N)$ may be an ideal throughput when $N=1$. For example, throughput may be linear and may be directly related to the number of factors. In one or more embodiments, $X(N)$ may not be an ideal throughput. For example, adding additional computing resources may lead to diminishing returns, as illustrated in FIG. 3. In one instance, a prediction model may determine where adding additional computing resources may lead to diminishing returns may occur. In another instance, a prediction model may determine where adding additional computing resources may lead to slowing down a process.

As another example, Table 4 shown the throughput values and capacity values, which were determined from the throughput values. In one or more embodiments, determining capacity values from throughput values may include determining $C(N)=X(N)/X(1)$, where $X(1)$ is an ideal throughput.

TABLE 4

| Throughput X(N) | Real Capacity C(N) |
|---|---|
| 1.333333333 | 1 |
| 16.853932580 | 12.64044944 |
| 56.603773580 | 42.45283019 |
| 59.523809520 | 44.64285714 |

TABLE 4-continued

| Throughput X(N) | Real Capacity C(N) |
|---|---|
| 76.335877860 | 57.2519084 |
| 84.269662920 | 63.20224719 |
| 89.086859690 | 66.81514477 |
| 92.081031310 | 69.06077348 |
| 95.759233930 | 71.81942254 |
| 98.039215690 | 73.52941176 |
| 97.847358120 | 73.38551859 |
| 96.463022510 | 72.34726688 |
| 91.855480710 | 68.89161053 |
| 84.745762710 | 63.55932203 |
| 88.894736840 | 66.67105263 |

In one or more embodiments, a prediction model 222A, 222B, 222C may include a machine learning prediction model. Although FIG. 2 illustrates prediction models 222A, 222B, 222C, any number of prediction models may be utilized, according to one or more embodiments. In one or more embodiments, a process 220 may determine a prediction model of multiple prediction models that is better or best adapted to the capacity values from process 216. For example, new and/or additional response times may be acquired, which may be converted to new and/or additional capacity values. In one instance, a first prediction model may be better adapted to a first data sample than a second prediction model, while the second prediction model may be better adapted to a second data sample (e.g., the first data sample and new and/or additional data) than the first prediction model. In another instance, a first prediction model of three or more prediction models may be best adapted to a first data sample than others of the three or more prediction models, while a second prediction model of the three or more prediction models may be best adapted to a second data sample (e.g., the first data sample and new and/or additional data) than others of the three or more prediction models. In one or more embodiments, data may be acquired at a first time, and new and/or additional data may be acquired at one or more times subsequent to the first time. For example, new and/or additional data may be acquired periodically (e.g., every ten minutes, every hour, every three hours, every day, every week, etc.).

In one or more embodiments, a prediction model 222A, 222B, 222C may include a process that is executable and/or implemented via a computer system. For example, an executable process of prediction model 222A, 222B, 222C may be utilized to predict data throughput of one or more computing instances. For instance, the executable process of prediction model 222A, 222B, 222C may be utilized to predict data throughput of one or more computing instances based at least on one or more response times that have been converted to throughput and/or to relative capacity.

In one or more embodiments, a process 230 may determine a better or best prediction model of two or more prediction models. For example, process 230 may determine a best prediction model of prediction models 222A, 222B, 222C. In one or more embodiments, each prediction model of prediction models 222A, 222B, 222C may be adapted to the capacity values process 216. For example, a prediction model 222 may include a polynomial, which may include one or more coefficients. In one instance, a polynomial may include $\alpha X$, where $\alpha$ is a coefficient of the polynomial and $X$ is an input variable. In another instance, a quadratic polynomial may include $\alpha X^2+\beta X$, where $\alpha$ and $\beta$ are coefficients of the quadratic polynomial and $X$ is an input variable.

In one or more embodiments, a process 232 may determine one or more coefficients of a polynomial of a prediction model 222A, 222B, 222C. In one example, process 232 may determine a coefficient α of a polynomial of a prediction model 222A. For instance, prediction model 222A may include a programmatic implementation of Amdahl's argument (which is sometimes referred to as Amdahl's law). In a second example, process 232 may determine coefficients α and β of a quadratic polynomial of a prediction model 222B. For instance, prediction model 222B may include an implementation of a universal scalability law. In another example, process 232 may determine coefficients a polynomial of a prediction model 222C. For instance, prediction model 222C may include a programmatic implementation of Gustafson's law.

In one or more embodiments, process 230 may utilize processes 232 and 234 in further determining a better or best prediction model. For example, process 230 may utilize processes 232 and 234 in further determining a best prediction model of prediction models 222A, 222B, 222C. In one or more embodiments, process 232 may perform one or more statistical significance tests based at least on data from process 216 (e.g., capacity values) and prediction models 222A, 222B, 222C. For example, process 232 may perform one or more statistical significance tests based at least on data from process 216 and polynomials of respective prediction models 222A, 222B, 222C, after process 230 determines coefficients of the polynomials.

In one or more embodiments, process 234 may perform one or more k-fold cross validations. For example, process 234 may include a resampling process that may be utilized to evaluate prediction models 222A, 222B, 222C based at least on data from process 216 (e.g., capacity values). For instance, process 234 may utilize a parameter "k" that may refer to a number of groups that data from process 216 may be split into. In one or more embodiments, process 234 may estimate how well a prediction model 222A, 222B, 222C is adapted to data from process 216. For example, a group of data from process 216 may be withheld while adapting a prediction model 222A, 222B, 222C. The group of data from process 216 may be withheld while adapting the specific prediction model 222A, 222B, 222C may be called a test data set. The specific prediction model 222A, 222B, 222C may be tested with the test data set and based at least on how well the specific prediction model 222A, 222B, 222C produces outcomes that are close enough to or are measured outcomes, the specific prediction model 222A, 222B, 222C may be retained. In one or more embodiments, the specific prediction model 222A, 222B, 222C may be scored based at least on differences between the measured outcomes and outcomes produced by the specific prediction model 222A, 222B, 222C.

In one or more embodiments, determining a best prediction model of multiple prediction models may include determining a correlation coefficient and coefficient of determination for each of the multiple prediction models. In one or more embodiments, a correlation coefficient, which may be represented by "R", may range between "−1" and "1". A negative correlation coefficient may signify a negative relationship, which may mean that a dependent variable decreases as an independent variable increases or may mean that a dependent variable increases as an independent variable decrease. A positive correlation coefficient may signify a positive relationship, where a dependent variable increases when an independent variable increases. A correlation coefficient of "0" may imply that there is no correlation between an independent and a dependent variable.

In one or more embodiments, when an absolute value of a correlation coefficient is closer to "1", a stronger correlation is indicated, and when an absolute value of a correlation coefficient is closer to "0", a weaker correlation is indicated. In one or more embodiments, a coefficient of determination may be a square of the correlation coefficient. For example, the coefficient of determination may be represented by "$R^2$" which may range between "0" and "1".

In one or more embodiments, the coefficient of determination may represent a proportion of a variation of data that is explained by a prediction model. In one example, a higher value of the coefficient of determination may indicate that more of the data can be explained by the prediction model. In a second example, a lower value of the coefficient of determination may indicate that less of the data can be explained by the prediction model. In another example, a coefficient of determination of "0" may indicate that there is no correlation between dependent and independent variables. Although the coefficient of determination may have a value of "0", such an instance may be rare.

In one or more embodiments, the correlation coefficient and the coefficient of determination may be measures of association. For example, an association may be a statistical relationship between two random variables. In one or more embodiments, determining how strongly two random variables are associated may include creating a regression model for two variables and determining a correlation coefficient and a coefficient of determination. Although an association between two variables may be high, it may not be inferred that behavior of a dependent variable is caused by changes in an independent variable, according to one or more embodiments. As an example of an association with causation, an independent variable may be a time spent exercising, and a dependent variable may be a number of calories burned. For instance, when a person spends more time exercising, the person burns more calories, since physical activity is known to burn calories. As an example of an association without causation, independent variable may be a number of tomatoes sold in a farmers' market, and a dependent variable may be a number of onions sold in the farmers' market. If it is assumed that association implied causation, it may be implied that when more tomatoes are sold, more onions are sold; however, there may be no guarantee that increased sales in tomatoes means increased sales in onions since different people need and/or buy different items, and causation may not be assumed in this example.

In one or more embodiments, when a best prediction model is determined, one or more predicted values may be utilized at 240. For example, the best prediction model may be utilized to provide extrapolated data as predicted values. In one instance, the extrapolated data may include effects of additional computing resources. In a second instance, the extrapolated data may include effects of additional one or more performance impacting factors 204. In another instance, the extrapolated data may include effects of changes in one or more performance impacting factors 204.

FIG. 3 illustrates an example of a graph that shows speed up versus computing resources, according to one or more embodiments. In the example of FIG. 3, a graph shows speed up versus computing resources. In one or more embodiments, a first computing workload, a second computing workload, a third computing workload, and a fourth computing workload may be associated with curves 310A-310D, respectively. For example, a computing workload may include one or more performance impacting factors. In one or more embodiments, when adding additional computing resources (e.g., additional processors), performance may not increase linearly. For example, at a point, adding additional computing resources may lead to diminishing returns.

As illustrated, speedup may increase linearly or nearly linearly for the first computing workload in a section 320A. As additional computing resources are utilized in processing the first computing workload, speedup may not increase linearly or nearly linearly in a section 320B. For example, speedup of the first computing workload may begin to diminish with additional computing resources in section 320B. As additional computing resources are utilized in processing the second computing workload, the third computing workload, and the fourth computing workload, speedup may not be appreciable in sections 320C-320E. As additional computing resources are utilized in processing the first computing workload, speedup may not be appreciable in section 320E for any of the first computing workload, the second computing workload, the third computing workload, and the fourth computing workload.

In one or more embodiments, a prediction model may determine the point where adding additional computing resources will lead to diminishing returns. For example, a first prediction model may be better adapted to a computing workload than a second prediction model. In one instance, the first prediction model may better predict a speedup when additional computing resources are utilized with the computing workload than the second prediction model. In another instance, the first prediction model may better predict where adding additional computing resources will lead to diminishing returns than the second prediction model.

Figure 4:
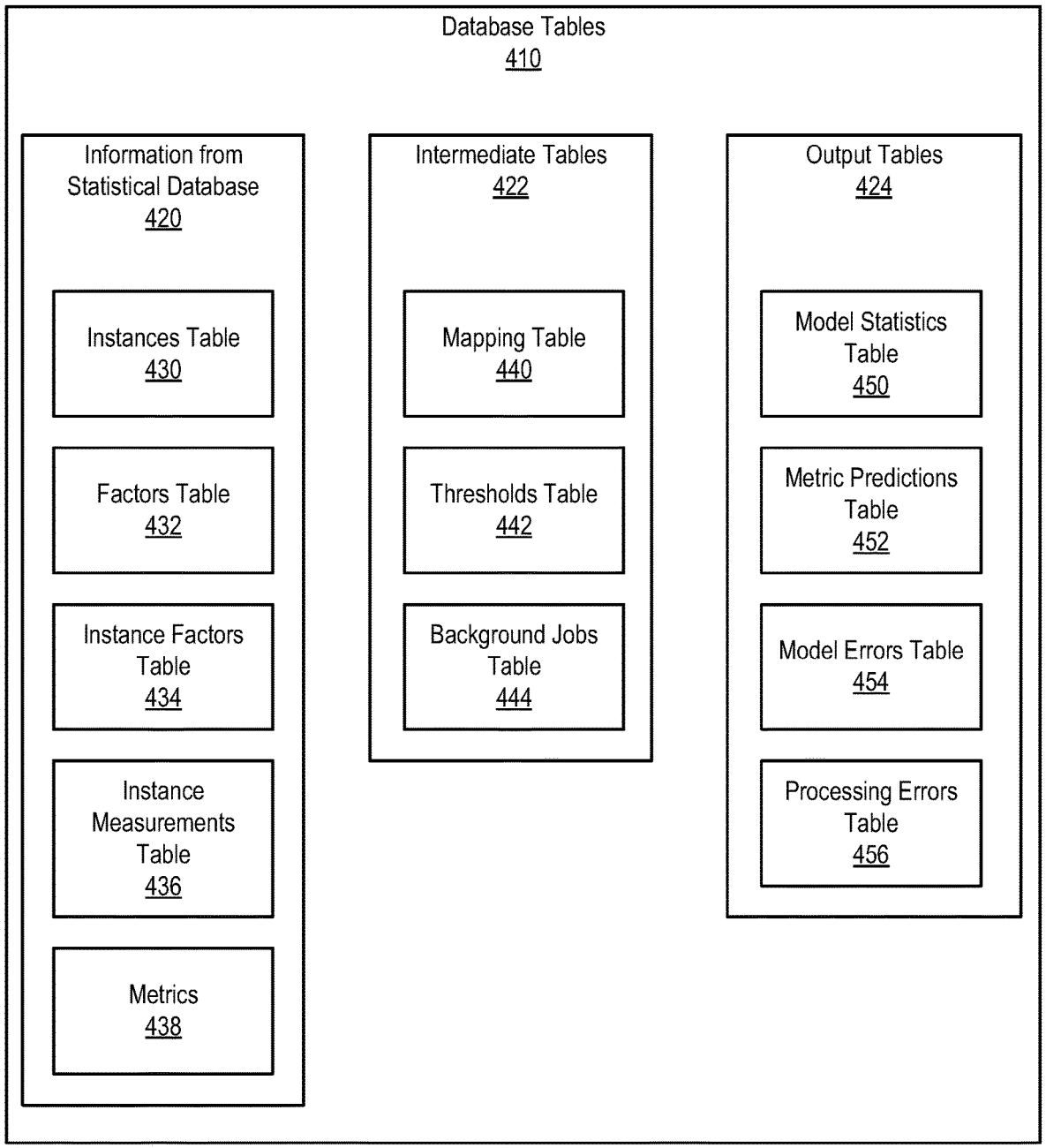
FIG. 4 illustrates an example of tables of a database, according to one or more embodiments.

FIG. 4 illustrates an example of tables of a database, according to one or more embodiments. In one or more embodiments, a database 132 may include database tables 410. In one or more embodiments, database tables 410 may include information from statistical database 420. For example, information from statistical database 420 may include statistical database 134. In one or more embodiments, information from statistical database 420 may include an instances table 430, a factors table 432, an instance factors table 434, an instance measurements table 436, and/or a metrics table 438, among others. In one or more embodiments, database tables 410 may include intermediate tables 422. In one or more embodiments, intermediate tables 422 may include a mapping table 440, a thresholds table 442, and/or a background jobs table 444, among others. In one or more embodiments, database tables 410 may include output tables 424. In one or more embodiments, output tables 424 may include a model statics table 450, a metric predictions table 452, a model errors table 454, and/or a processing errors table 456, among others.

Figure 5A:
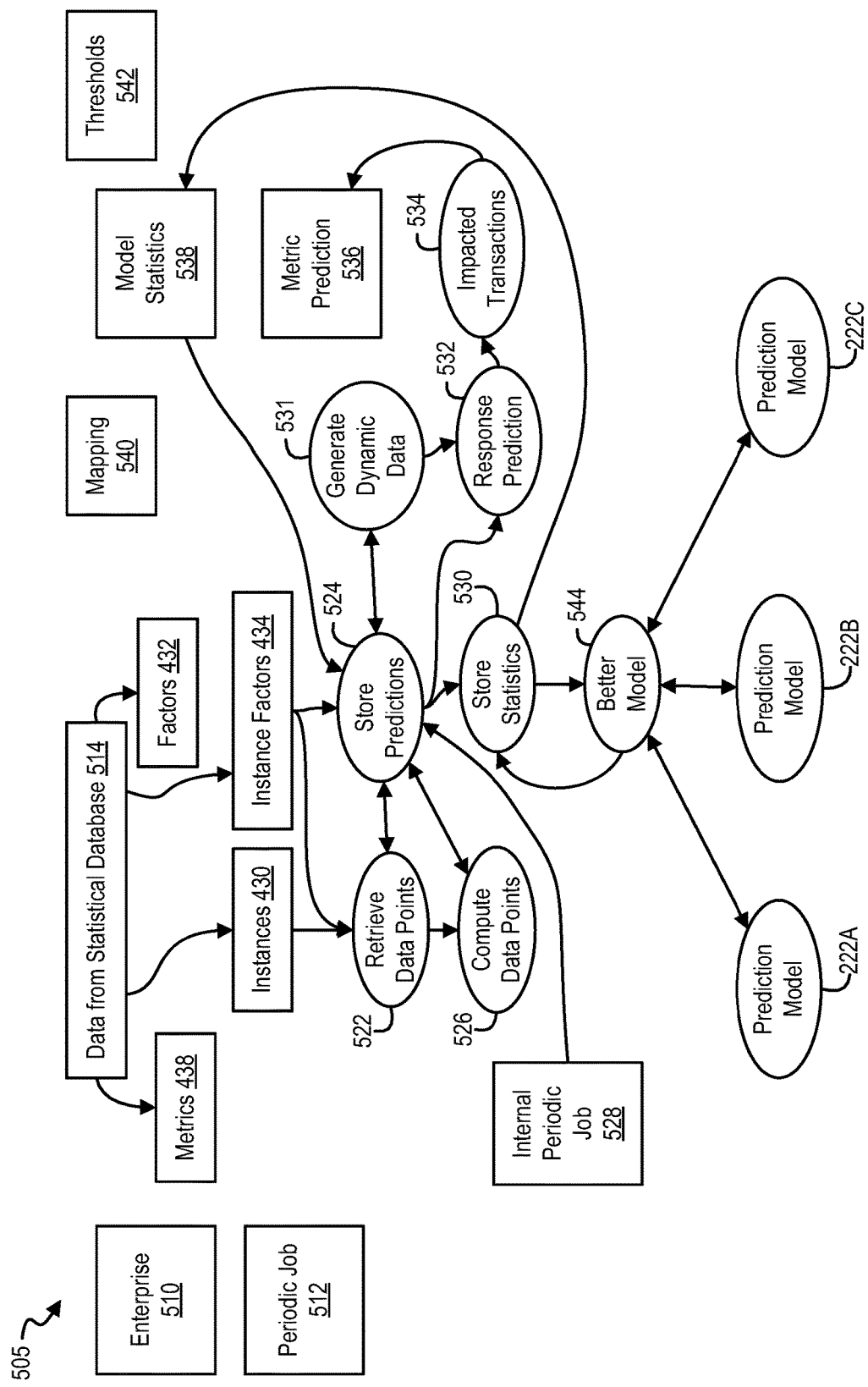
FIG. 5A and FIG. 5B illustrate another example of a framework that determines a prediction model from multiple prediction models, according to one or more embodiments.
Figure 5B:
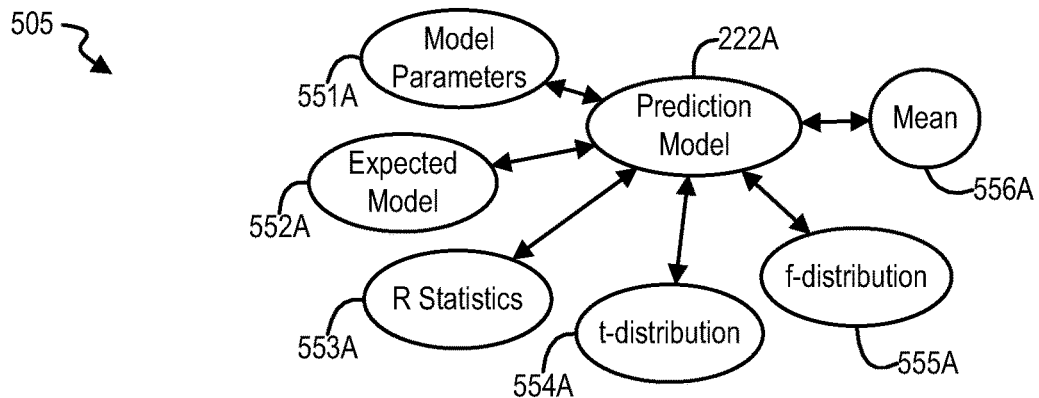
Figure 5B:
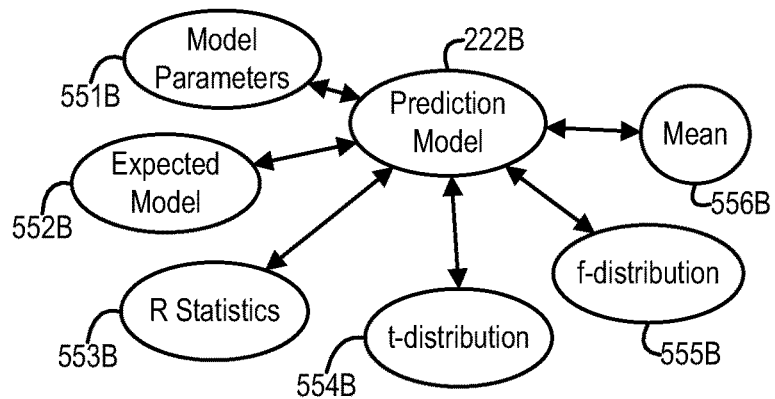
Figure 5B:
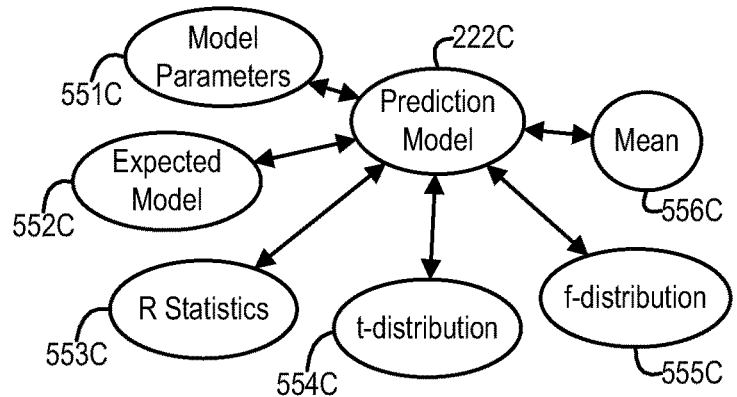

FIG. 5A and FIG. 5B illustrate another example of a framework that determines a prediction model from multiple prediction models, according to one or more embodiments. FIG. 5A may be interpreted as a state diagram representing functional states of stored program instructions of FIG. 1A, linked by data flow paths to data sources and data outputs. In one or more embodiments, a framework 505 may include an enterprise 510 and the enterprise may include multiple computer systems. For instance, at least a portion of the multiple computer systems may include and/or execute multiple e-procurement platform instances 110.

In one or more embodiments, a computer system of framework 505 may execute a periodic job 512. For instance, periodic job 512 may be programmed to gather and/or capture data associated with performance factors. In one or more embodiments, periodic job 512 may be executed at any period. For example, periodic job 512 may be executed every ten minutes, every hour, every three hours, every day, every week, etc. In one or more embodiments, framework 505 may include data from statistical database 514. For example, data of statistical database 514 may be obtained from statistical database 134.

In one or more embodiments, data from statistical database 514 may be added to tables 430, 432, 434, 436, and 438 (FIG. 4), among others. For conciseness, instances table 430 is abbreviated as "instances 430" in FIG. 5A and instance factors table 434 is termed "instance factors 434". For example, adding data from statistical database 514 to tables 430, 432, 434, 436, and 438 may include inserting adding data from statistical database 514 into rows of tables 430, 432, 434, 436, and 438. In one or more embodiments, a process 522 may retrieve data points from tables 430 and 434 and/or may retrieve data points from a process 524, which may store predictions. In one or more embodiments, process 524 may retrieve data from tables 430 and 434 and/or may store predictions based at least on the data tables 430 and 434.

In one or more embodiments, a process 526 may receive data from process 522 and 524. For example, process 526 may compute data points based at least on the data from process 522 and 524. In one or more embodiments, framework 505 may include an internal periodic job 528. For example, a computer system of framework 505 may execute internal periodic job 528. For instance, internal periodic job 528 may provide data to process 524.

In one or more embodiments, a process 530 may receive data from process 524 and/or may store statistics. For example, process 530 may receive predictions from process 524. In one or more embodiments, a process 531 may receive data from process 524 and/or may generate dynamic data. For example, process 531 may receive predictions from process 524. In one or more embodiments, a process 532 may receive data from process 524, may receive dynamic data from process 531, and/or may provide a response to a prediction. For example, process 532 may provide a response to a prediction from process 524 based at least on dynamic data from process 531.

In one or more embodiments, a process 534 may determine one or more impacted transactions. For example, a process 534 may determine one or more impacted transactions based at least on a response to a prediction from process 532. In one or more embodiments, process 534 may provide one or more impacted transactions to a process 536, which may determine one or more metrics on one or more predictions. In one or more embodiments, a process 538 may model statistics. For example, process 538 may receive statistics from process 530. In one or more embodiments, process 538 may provide data to process 524. For example, process 538 may provide model statistics to process 524. For instance, process 524 may store predictions based at least on model statistics from process 538.

In one or more embodiments, a process 544 may receive data from process 530 and/or may determine a better model. For example, process 544 may determine a prediction model of prediction models 222A, 222B, 222C of FIG. 2. For instance, process 544 may determine a prediction model that is better than any other of multiple predictions models. In one or more embodiments, as seen in FIG. 5B, a prediction model 222A, 222B, 222C may utilize and/or generate model parameters 551, an expected model 552, R statistics 553, a t-distribution 554, a f-distribution 555, and/or a mean 556, among others. In one example, prediction model 222A may utilize and/or generate model parameters 551A, an expected model 552A, R statistics 553A, a t-distribution 554A, a f-distribution 555A, and/or a mean 556A, among others. In a second example, prediction model 222B may utilize and/or generate model parameters 551B, an expected model 552B, R statistics 553B, a t-distribution 554B, a f-distribution 555B, and/or a mean 556B, among others. In another example, prediction model 222C may utilize and/or generate model parameters 551C, an expected model 552C, R statistics 553C, a t-distribution 554C, a f-distribution 555C, and/or a mean 556C, among others.

Figure 6:
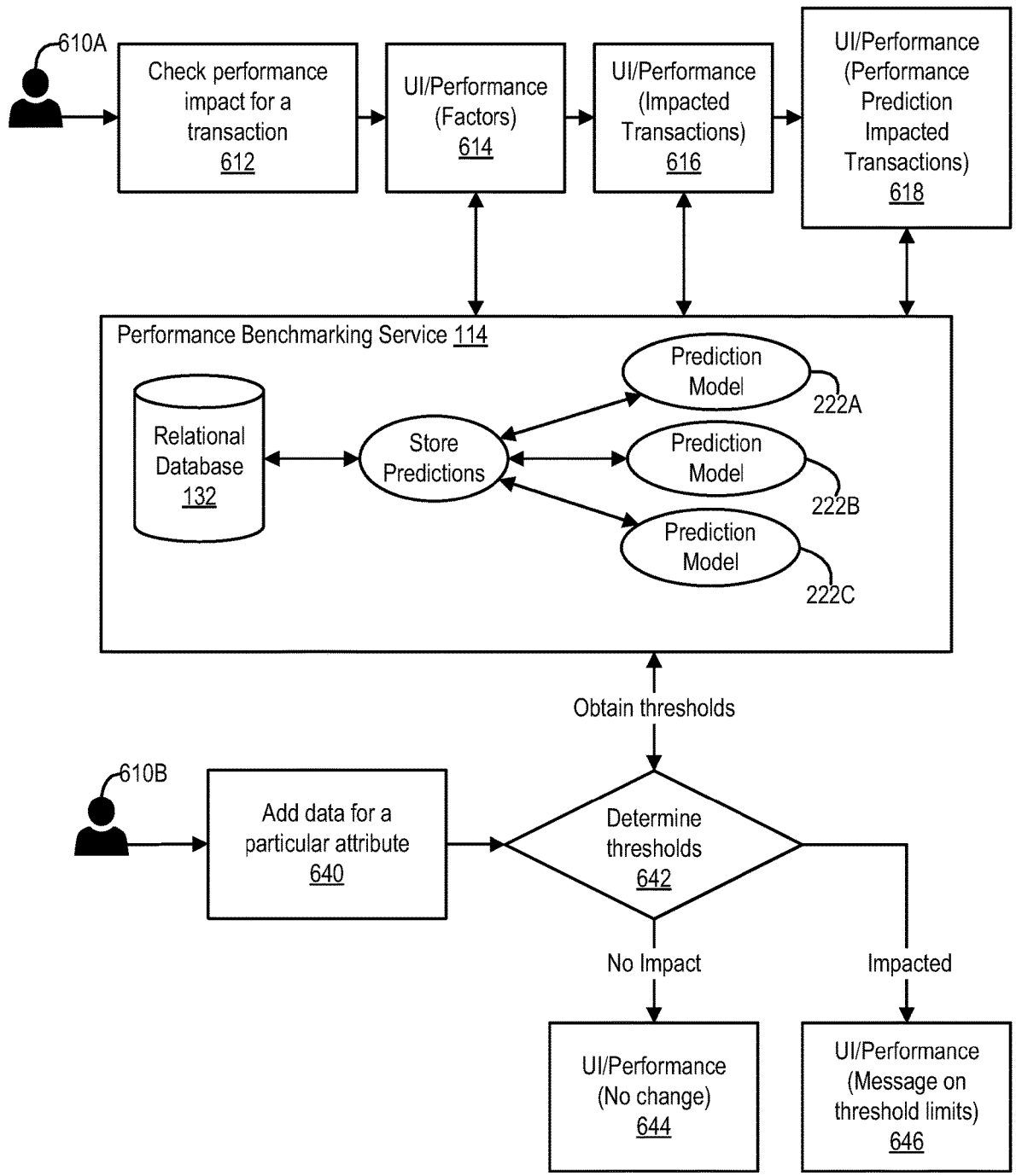
FIG. 6 illustrates an example of a method is illustrated, according to one or more embodiments.

FIG. 6 illustrates an example of a method is illustrated, according to one or more embodiments. In one or more embodiments, a user (e.g., an administrator) 610A may check a performance impact of a transaction, at 612. At 614, factors of user interface/performance may be determined. For example, the factors of user interface/performance may be determined via performance benchmark service 114. At 616, impacted transactions of user interface/performance may be determined. For example, the impacted transactions of user interface/performance may be determined via performance benchmark service 114.

In one or more embodiments, performance prediction impacted transactions of user interface/performance may be determined, at 618. For example, the performance prediction impacted transactions of user interface/performance may be determined via performance benchmark service 114. In one or more embodiments, a user 610B may add data for a particular attribute, at 640. At 642, thresholds may be determined. In one or more embodiments, determining the thresholds may include obtaining thresholds from performance benchmark service 114. If there is no impact from the thresholds, user interface/performance may be provided to user 610B, at 644. If there is an impact from the thresholds, a message associated with threshold limits may be provided to user 610B, at 646.

4. Graphical User Interface Overview

Figure 7A:
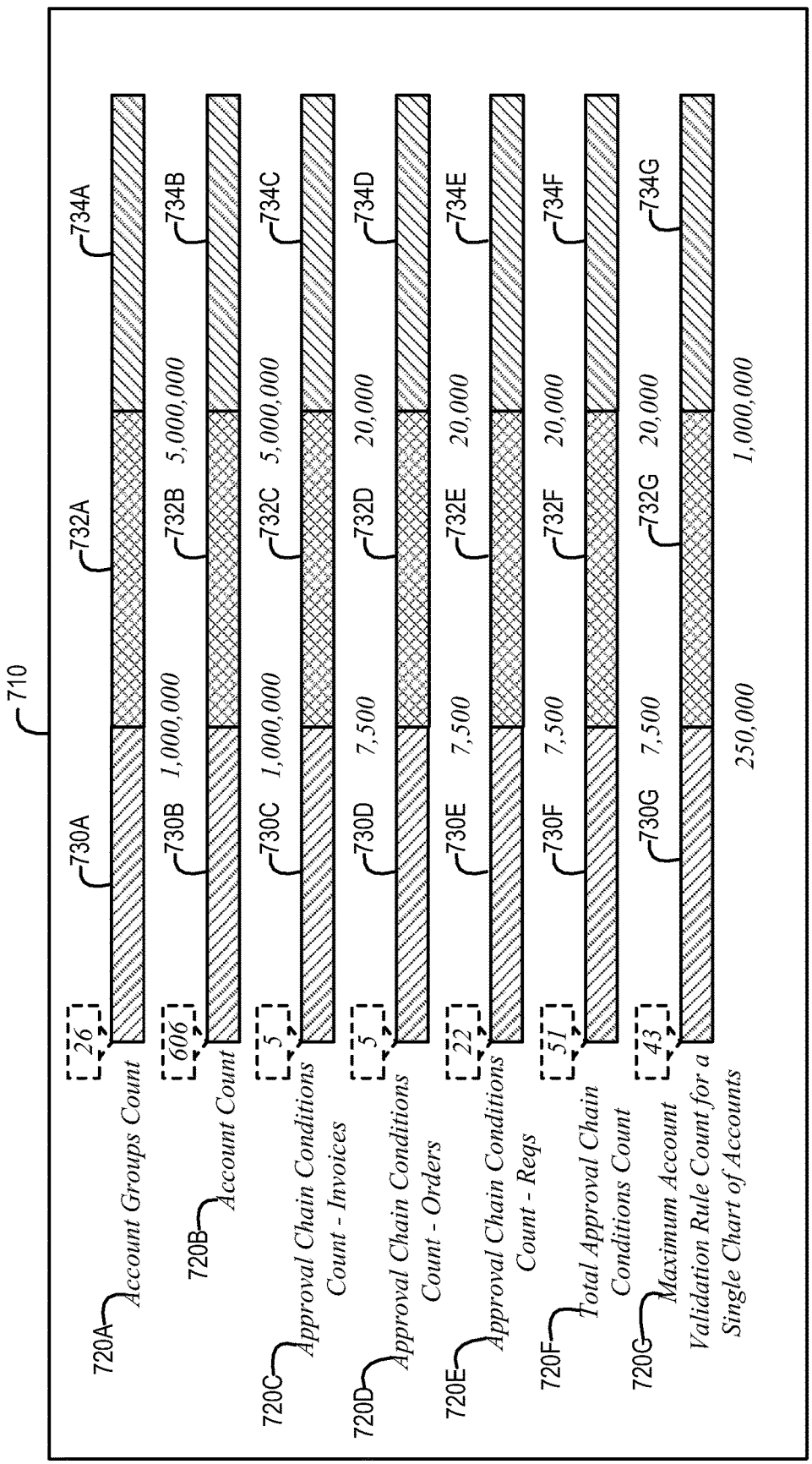
FIG. 7A illustrates an example of a graphical user interface, according to one or more embodiments.

FIG. 7A illustrates an example of a graphical user interface, according to one or more embodiments. In one or more embodiments, a graphical user interface 710 may include texts 720A-720G that may be associated with respective performance factors. In one or more embodiments, graphical user interface 710 may include zones 730A-730G, zones 732A-732G, and/or zones 734A-734G, among others, that may be associated with and/or indicate response times. In one example, zones 730A-730G may be associated with and/or may indicate response times that are less than two seconds. In a second example, zones 732A-732G may be associated with and/or may indicate response times that are two seconds. In another example, zones 734A-734G may be associated with and/or may indicate response times that are five seconds. In one or more embodiments, a number of performance factors may affect response times. In one example, if an account groups count exceeds "1,000,000", a response time may increase from less than two seconds to two seconds. In another example, if an account groups count exceeds "5,000,000", a response time may increase from two seconds to five seconds.

Figure 7B:
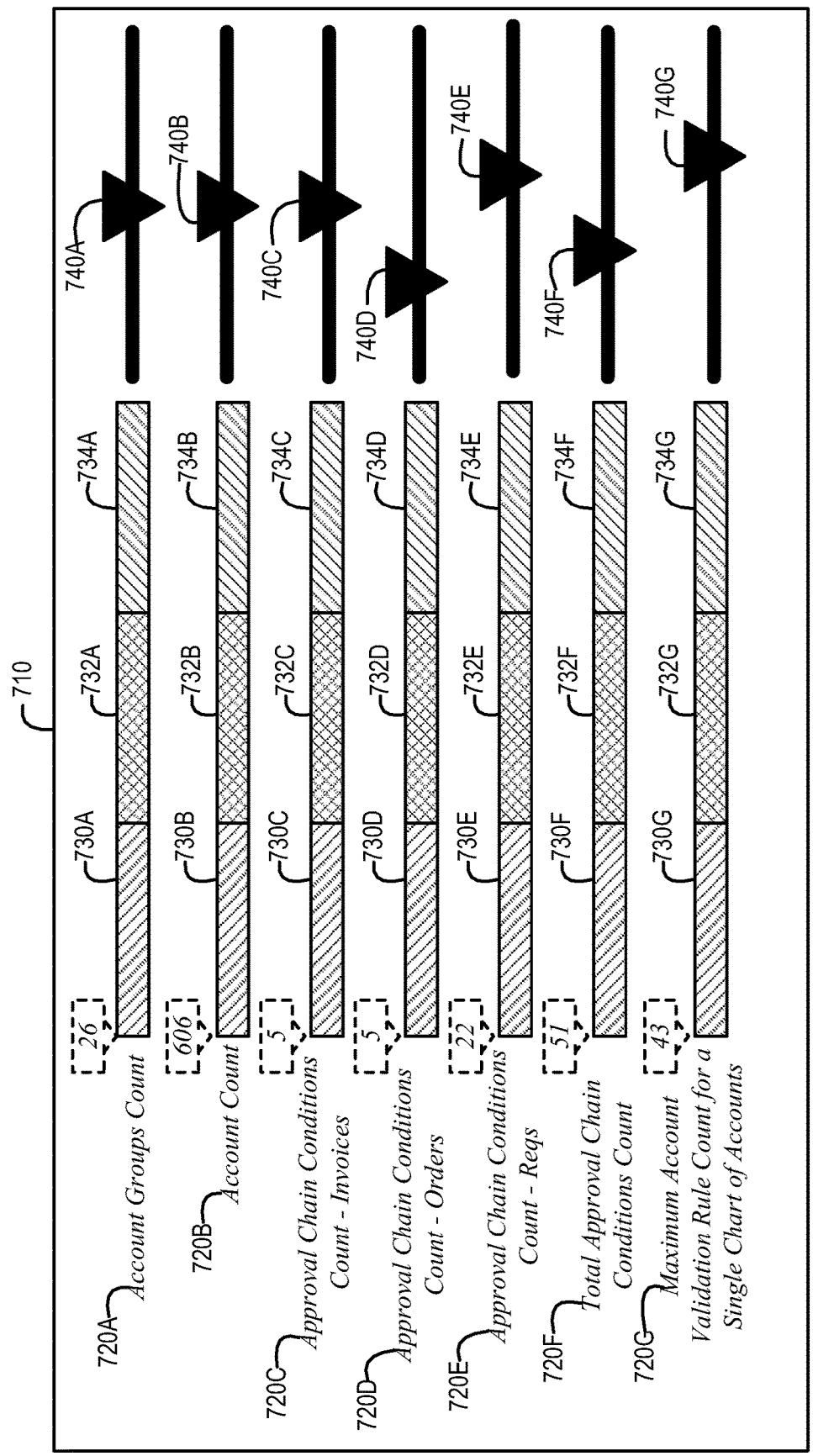
FIG. 7B illustrates a second example of a graphical user interface, according to one or more embodiments.

FIG. 7B illustrates a second example of a graphical user interface, according to one or more embodiments. In one or more embodiments, graphical user interface 710 may include user input elements 740A-740G. For example, user input elements 740A-740G may include slider user input elements. In one instance, a user may slide a user input element 740 to change an input value of a performance factor. In another instance, a user may slide a user input element 740 to change a quantity of performance factors (e.g., increase and/or decrease a quantity of performance factors). As an example, a user input element 740 may include a selection graphical user element that permits modifying an attribute of a particular software instance, which may be associated with a particular consumer computer.

In one or more embodiments, performance benchmark service 414 may determine one or more predictions from a prediction model based at least on user input from a user input element 740. For example, graphical user interface 710 may provide output that indicates the one or more predictions from the prediction model based at least on the user input from a user input element 740. In one or more embodiments, a user input element 740 may be utilized to decrease a number of performance factors and/or may be utilized to increase a number of performance factors.

Figure 8:
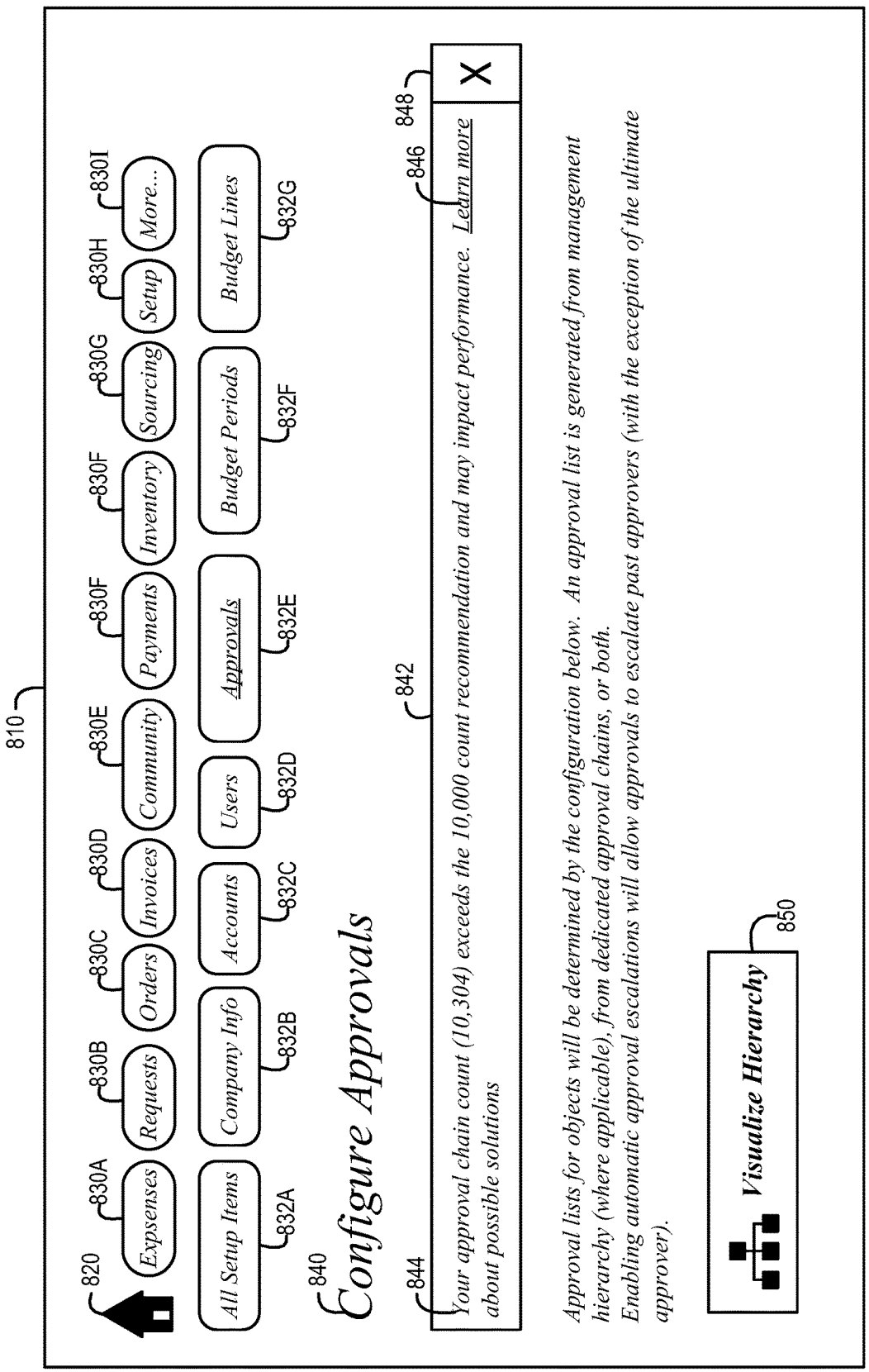
FIG. 8 illustrates another example of a graphical user interface, according to one or more embodiments.

FIG. 8 illustrates another example of a graphical user interface, according to one or more embodiments. In one or more embodiments, a graphical user interface 810 may include graphical user interface elements. In one example, graphical user interface 810 may include a web browser associated with a user (e.g., an administrator). In a second example, graphical user interface 810 may include a portion of a web browser associated with the user. In another example, graphical user interface 810 may be displayed by a web browser associated with the user. In one or more embodiments, graphical user interface 810 may include graphical user interface elements 820-850. In one example, graphical user interface element 820 may include a link (e.g., a hyperlink) to a "home" graphical user interface. In a second example, graphical user interface elements 830A-830I and 832A-832G may include respective texts and/or may include respective links (e.g., hyperlinks) to other graphical user interfaces. In a third example, graphical user interface element 840 may include text, which may indicate that graphical user interface 810 is associated with configuring approvals. In a fourth example, graphical user interface element 842 may include text and/or a link (e.g., a hyperlink). For instance, graphical user interface element 842 may include text 844, which may indicate that an approval chain count exceeds a recommended threshold approval chain count, and a link (e.g., a hyperlink) that may link to another graphical user interface, which may provide information about what may be performed about increasing response times. In a fifth example, graphical user interface element 848 may be selected to dismiss, remove, or collapse graphical user interface element 842. In another example, graphical user interface element 850 may include text, a graphic, and a link (e.g., a hyperlink), which may link to another graphical user interface that may provide a visual hierarchy of performance factors.

5. Method Overview

Figure 9:
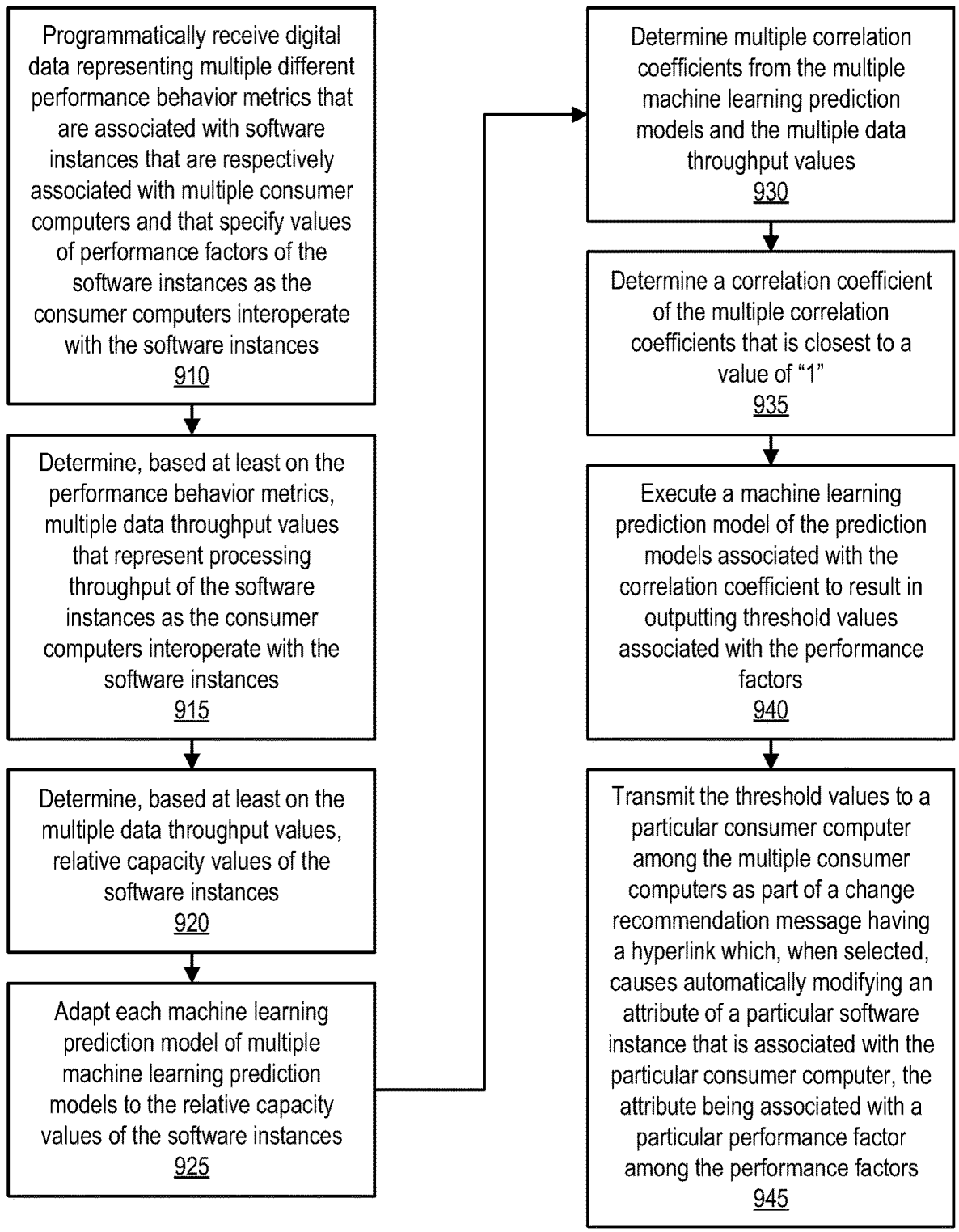
FIG. 9 illustrates an example of a method of operating a performance benchmark service, according to one or more embodiment.

FIG. 9 illustrates an example of a method of operating a performance benchmark service, according to one or more embodiment. At 910, digital data representing multiple different performance behavior metrics that are associated with software instances that are respectively associated with multiple consumer computers and that specify values of performance factors of the software instances as the consumer computers interoperate with the software instances may be programmatically received.

At 915, multiple data throughput values that represent processing throughput of the software instances as the consumer computers interoperate with the software instances may be determined based at least on the performance behavior metrics. At 920, relative capacity values of the software instances may be determined based at least on the multiple data throughput values, relative capacity values of the software instances.

At 925, each machine learning prediction model of multiple machine learning prediction models may be adapted to the relative capacity values of the software instances. In one or more embodiments, adapting each machine learning prediction model of multiple machine learning prediction models to the relative capacity values of the software instances may include determining, from the relative capacity values of the software instances, coefficients for multiple polynomials associated with respective multiple prediction models. For example, coefficients for multiple polynomials associated with respective multiple prediction models 550A-550C may be determined from the relative capacity values of the software instances. In one or more embodiments, adapting each machine learning prediction model of multiple machine learning prediction models to the relative capacity values of the software instances may include estimating relationships between a dependent variable (e.g., an outcome variable) and one or more independent variables (e.g., one or more predictors, one or more covariates, one or more features, etc.).

At 930, multiple correlation coefficients may be determined from the multiple machine learning prediction models and the multiple data throughput values. In one example, a correlation coefficient determined from a machine learning prediction model and the multiple data throughput values may numerically indicate how well the machine learning prediction model matches the multiple data throughput values. In another example, a correlation coefficient determined from a machine learning prediction model and the multiple data throughput values may numerically indicate how well the machine learning prediction model is able to predict the multiple data throughput values.

At 935, a correlation coefficient of the multiple correlation coefficients that is closest to a value of "1" may be determined. At 940, a machine learning prediction model of the machine learning prediction models associated with the correlation coefficient may be executed to result in outputting threshold values associated with the performance factors.

At 945, the threshold values may be transmitted to a particular consumer computer among the multiple consumer computers as part of a change recommendation message having a hyperlink which, when selected, causes automatically modifying an attribute of a particular software instance that is associated with the particular consumer computer, the attribute being associated with a particular performance factor among the performance factors. In one or more embodiments, the threshold values may be transmitted to the particular consumer computer via a network.

Using the techniques of the disclosure that have been described thus far, stored program computer systems may be architected, arranged, and programmed to solve the technical problems identified in the background. In particular, the disclosure has shown how to construct a computer system that is programmed in a new way to measure various performance factors of SaaS systems, report system state, warn if prescribed threshold values are crossed, and predict future system state.

6. Computer System Overview

Figure 10A:
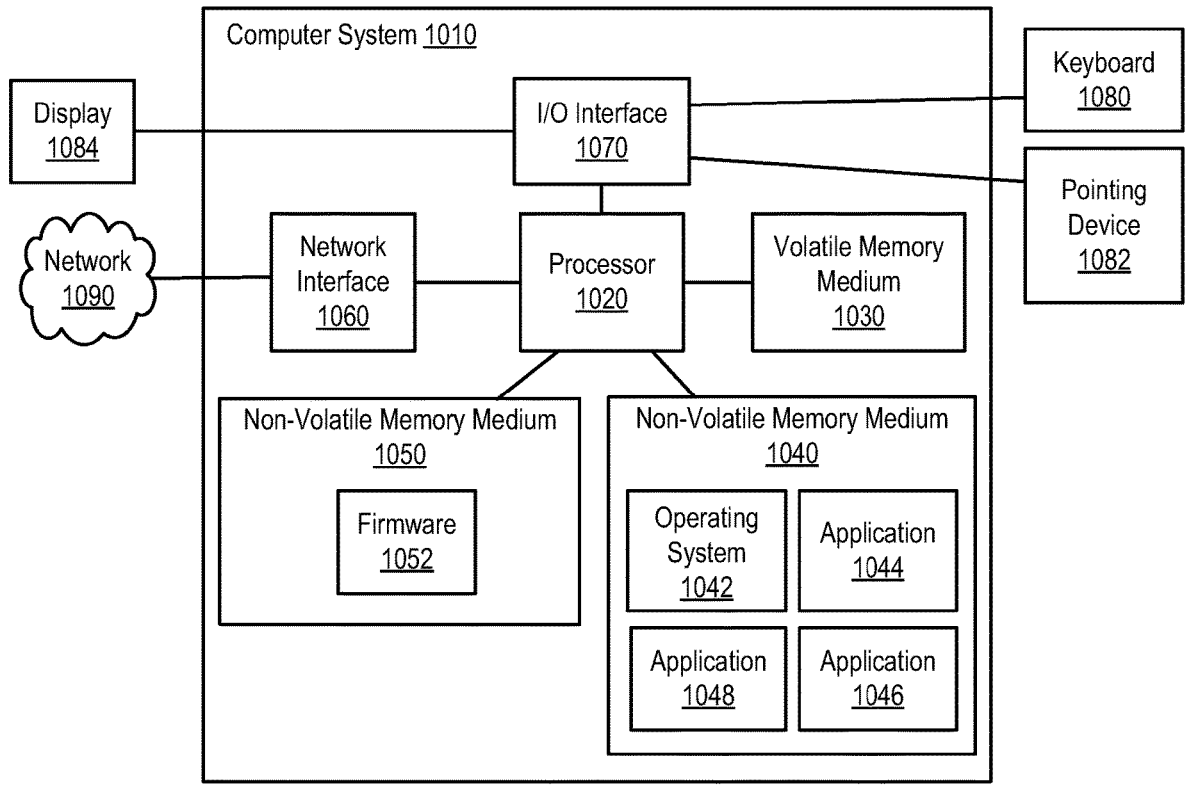
FIG. 10A illustrates an example of a computer system, according to one or more embodiments.
Figure 10B:
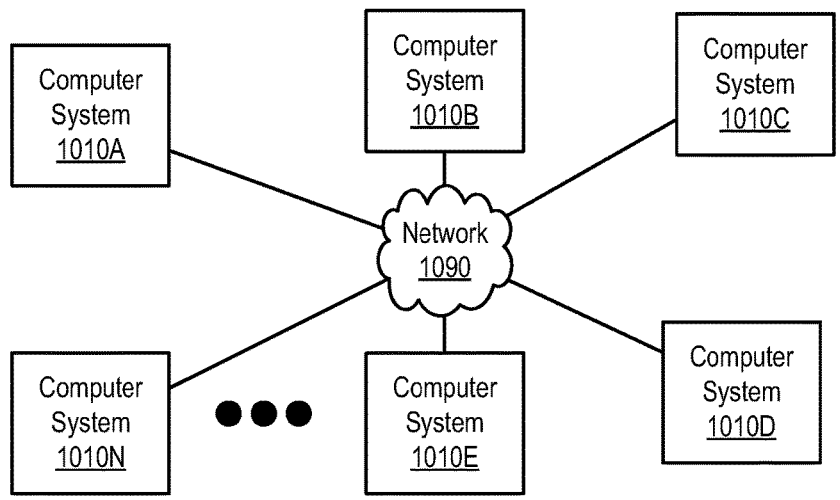
FIG. 10B illustrates an example of computer systems communicatively coupled to a network, according to one or more embodiments.

FIG. 10A illustrates an example of a computer system, according to one or more embodiments; FIG. 10B illustrates an example of computer systems communicatively coupled to a network, according to one or more embodiments. Referring first to FIG. 10A, an example of a computer system is illustrated, according to one or more embodiments.

In one or more embodiments, a computer system 1010 may include one or more hardware resources. As shown, computer system 1010 may include a processor 1020, a volatile memory medium 1030, non-volatile memory media 1040 and 1050, a network interface 1060, and an I/O interface 1070. Although not specifically illustrated, computer system 1010 may include other one or more components, according to one or more embodiments. As shown, volatile memory medium 1030, non-volatile memory media 1040 and 1050, network interface 1060, and I/O interface 1070 may be communicatively coupled to processor 1020. In one or more embodiments, other one or more components that computer system 1010 may include may be communicatively coupled to processor 1020. Although computer system 1010 is illustrated with a single processor 1020, computer system 1010 may include multiple processors 1020. In one or more embodiments, a processor 1020 may include multiple processor cores.

In one or more embodiments, processor 1020 may include one or more of a system, a device, and an apparatus operable to interpret and/or execute program instructions and/or process data, among others. In one or more embodiments, processor 1020 may include one or more of a microprocessor, a microcontroller, a graphics processing unit (GPU), a digital signal processor (DSP), an application specific integrated circuit (ASIC), a field programmable gate array (FPGA), and another digital circuitry and/or analog circuitry configured to interpret and/or execute program instructions and/or process data, among others. In one example, processor 1020 may interpret and/or execute program instructions and/or process data stored locally (e.g., via memory media 1030, 1040, and 1040, via another component of computer system 1010, etc.). In another example, processor 1020 may interpret and/or execute program instructions and/or process data stored remotely. In one or more embodiments, one or more of an ASIC and a FPGA, among others, may be configured to implement at least a portion of one or more systems, at least a portion of one or more flowcharts, at least a portion of one or more methods, and/or at least a portion of one or more processes described herein.

In one or more embodiments, one or more of volatile memory medium 1030, non-volatile memory media 1040 and 1050, network interface 1060, and I/O interface 1070 may be communicatively coupled to processor 1020 via one or more root complexes, one or more switches, and/or one or more buses, among others. In one example, one or more of volatile memory medium 1030, non-volatile memory media 1040 and 1050, network interface 1060, and I/O interface 1070 may be communicatively coupled to processor 1020 via one or more Peripheral Component Interconnect (PCI) busses. In a second example, one or more of volatile memory medium 1030, non-volatile memory media 1040 and 1050, network interface 1060, and I/O interface 1070 may be communicatively coupled to processor 1020 via one or more PCI-Express (PCIe) root complexes. In another example, one or more of volatile memory medium 1030, non-volatile memory media 1040 and 1050, network interface 1060, and I/O interface 1070 may be communicatively coupled to processor 1020 via one or more PCIe switches.

In one or more embodiments, computer system 1010 may include one or more buses operable to transmit communication between or among two or more hardware components. In one example, a bus may include one or more of a memory bus, a peripheral bus, and a local bus, among others. In another example, a bus may include one or more of a PCI bus, a low pin count (LPC) bus, an inter-integrated circuit (I²C) bus, a serial peripheral interface (SPI) bus, an enhanced serial peripheral interface (eSPI) bus, a system management bus (SMBus), and a universal serial bus (USB), among others.

In one or more embodiments, one or more of a keyboard 1080, a pointing device 1082 (e.g., a mouse, a touchpad, a trackball, etc.), and a display 1084 may be coupled to I/O interface 1070. For example, one or more of keyboard 1080, pointing device 1082, and display 1084 may be coupled to computer system 1010 via I/O interface 1070. Although keyboard 1080, pointing device 1082, and display 1084 are illustrated as being external to computer system 1010, computer system 1010 may include one or more of keyboard 1080, pointing device 1082, and display 1084, according to one or more embodiments.

In one or more embodiments, computer system 1010 may receive user input via one or more of keyboard 1080 and pointing device 1082, among others. In one example, keyboard 1080 may include alphanumeric and/or other keys for communicating information and command selections from a user to computer system 1010. In another example, pointing device 1082 may be utilized by a user to communicate direction information and/or command selections to computer system 1010 and/or to control cursor movement on display 1084. For instance, pointing device 1082 may include two degrees of freedom in two axes, a first axis (e.g., an x-axis) and a second axis (e.g., a y-axis), which may allow pointing device 1082 to specify positions and/or directions in a plane (e.g., a plane of display 1084, a plane of a window displayed by display 1084, etc.).

In one or more embodiments, computer system 1010 may provide information to a user via display 1084. For example, computer system 1010 may display information and/or graphics to a user via display 1084. In one or more embodiments, computer system 1010 may receive user input via display 1084. For example, display 1084 may include a touch screen, which may receive the user input. For instance, display 1084 may provide the user input to computer system 1010.

In one or more embodiments, the term "memory medium" may mean a "computer-readable medium", a "tangible computer readable storage medium", a "storage device", a "memory device", and/or a "memory". In one example, a memory medium may include a volatile memory medium. Various examples of volatile memory media may include a random access memory (RAM), a dynamic RAM (DRAM), a static RAM (SRAM), and/or an extended data out RAM (EDO RAM), among others.

In a second example, a memory medium may include a non-volatile memory medium. For instance, a non-volatile memory medium may store information for an amount of time that is non-transitory. Various examples of non-volatile memory media may include a read only memory (ROM), a programmable ROM (PROM), an erasable PROM (EPROM), an electrically erasable PROM, ferroelectric RAM (FRAM), a magnetic storage medium (e.g., a hard drive, a floppy disk, a magnetic tape, etc.), an optical storage medium (e.g., a CD (compact disc), a DVD (digital video disc), a BLU-RAY disc, etc.), flash memory, and/or a solid state drive (SSD), among others. In another example, a memory medium may include one or more volatile memory media and/or one or more non-volatile memory media. For instance, a memory medium may include a non-volatile RAM (NVRAM), which may include DRAM and flash memory.

In one or more embodiments, network interface 1060 may be coupled to a network 1090. For example, computer system 1010 may be coupled to network 1090 via network interface 1060. In one instance, network interface 1060 may include a wired network interface. As an example, network interface 1060 may enable computer system 1010 to communicate with network 1090 in a wired fashion. In another instance, network interface 1060 may include a wireless network interface. As an example, network interface 1060 may enable computer system 1010 to communicate with network 1090 in a wireless fashion. In one or more embodiments, computer system 1010 may communicate with network 1090 and/or another computer system 1010 utilizing one or more communication protocols and/or one or more communication standards. For example, computer system 1010 may communicate with network 1090 and/or the other computer system 1010 utilizing one or more of a packet-based protocol, an Internet protocol (IP), a transmission control protocol (TCP), a user datagram protocol (UDP), a hypertext transfer protocol (HTTP), a network file system (NFS) protocol, an Internet SCSI (iSCSI) protocol, or any combination thereof, among others.

In one or more embodiments, network 1090 may include a wired network, a wireless network, an optical network, or a combination of the foregoing, among others. For example, network 1090 may include and/or be coupled to various types of communications networks. For instance, network 1090 may include and/or be coupled to a local area network (LAN), a wireless LAN (WLAN), a wide area network (WAN) (e.g., a private WAN, a corporate WAN, a public WAN, etc.), an Internet, a public switched telephone network (PSTN), a cellular telephone network, a satellite telephone network, or a combination of the foregoing, among others. In one or more embodiments, network interface 1060 may be communicatively coupled to various types of networks, such as a personal area network (PAN), a LAN, a WAN, a metropolitan area network (MAN), a WLAN, a virtual private network (VPN), an intranet, an Internet or another appropriate architecture or system that facilitates the communication of signals, data and/or messages.

In one or more embodiments, network 1090 may transmit data utilizing a desired storage and/or communication protocol, which may include one or more of Frame Relay, Fiber Channel, Asynchronous Transfer Mode (ATM), an IP, a packet-based protocol, an iSCSI protocol, or any combination thereof, among others. In one or more embodiments, network interface 1060 may be communicatively coupled to a network storage resource. For example, network interface 1060 may be communicatively coupled to a storage area network (SAN).

In one or more embodiments, processor 1020 may execute processor instructions in implementing at least a portion of one or more systems, at least a portion of one or more flowcharts, at least a portion of one or more methods, and/or at least a portion of one or more processes described herein. In one example, processor 1020 may execute processor instructions from one or more of memory media 1030, 1040, and 1040 in implementing at least a portion of one or more systems, at least a portion of one or more flowcharts, at least a portion of one or more methods, and/or at least a portion of one or more processes described herein. In another example, processor 1020 may execute processor instructions via network interface 1060 in implementing at least a portion of one or more systems, at least a portion of one or more flowcharts, at least a portion of one or more methods, and/or at least a portion of one or more processes described herein. For instance, computer system 1010 may receive processor instructions from network 1090 and/or from another computer system 1010 via network 1090.

In one or more embodiments, non-volatile memory medium 1040 may include an operating system 1042 and applications 1044-1048. For example, one or more of operating system 1042 and applications 1044-1048 may include processor instructions, which may be executed by processor 1020 in implementing at least a portion of one or more systems, at least a portion of one or more flowcharts, at least a portion of one or more methods, and/or at least a portion of one or more processes described herein. In one or more embodiments, at least a portion of operating system 1042 and/or at least a portion of an application of applications 1044-1048 may be transferred to volatile memory medium 1030. For example, the least the portion of operating system 1042 and/or the at least the portion of the application of applications 1044-1048 may be executed by processor 1020 from volatile memory medium 1030.

In one or more embodiments, non-volatile memory medium 1050 may firmware 1052. For example, firmware 1052 may include processor instructions executable by processor 1020. For instance, firmware 1052 may include one or more structures and/or one or more functionalities of and/or may be compliant with one or more of a basic input/output system (BIOS), an Advanced Configuration and Power Interface (ACPI), an Extensible Firmware Interface (EFI), and a Unified Extensible Firmware Interface (UEFI), among others. In one or more embodiments, at least a portion of firmware 1052 may be transferred to volatile memory medium 1030. For example, the least the portion of firmware 1052 may be executed by processor 1020 from volatile memory medium 1030. In one or more embodiments, processor 1020 may execute at least a portion of firmware 1052 in implementing at least a portion of one or more systems, at least a portion of one or more flowcharts, at least a portion of one or more methods, and/or at least a portion of one or more processes described herein.

In one or more embodiments, computer system 1010 may be configured to calculate, classify, produce, transmit, receive, retrieve, store, process, display, detect, record, reproduce, handle, and/or utilize one or more forms of information and/or data for scientific, control, entertainment, business, or any other purpose. In one or more embodiments, computer system 1010 may include a desktop computer system, a laptop computer system, a server computer system, a personal computer system, a mobile computing device, a tablet computing device, a wireless telephone, a personal digital assistant (PDA), a consumer electronic device, an electronic camera, an electronic video player, an electronic music player, a wireless access point, a network storage device, or any other suitable computing device. In one or more embodiments, computer system 1010 may vary in size, shape, performance, and/or functionality. In one or more embodiments, a portable computer system 1010 may include or have a form factor of that of or similar to one or more of a notebook, a laptop, a telephone, a tablet, and a personal digital assistant, among others. For example, a portable computer system 1010 may be readily carried and/or transported by a person.

In one or more embodiments, computer system 1010 may include one or more communications ports for communicating with external devices as well as various input and output (I/O) devices. In one example, computer system 1010 may include one or more one or more communications ports for communicating with one or more of keyboard 1080, pointing device 1082, and display 1084, among others. In another example, computer system 1010 may include one or more one or more communications ports for communicating with one or more external storage devices (e.g., a USB drive, a serial AT attachment (SATA) storage device, a serial attached small computer system interface (SCSI) storage device, etc.).

In one or more embodiments, I/O interface 1070 may represent a variety of communication interfaces. For example, I/O interface 1070 may include one or more of a graphics interface, a video interface, an audio interface, a user input interface, and a peripheral interface, among others. In one instance, I/O interface 1070 may communicate with a device in a wired fashion. As one example, I/O interface 1070 may communicate with one or more of keyboard 1080 and pointing device 1082, among others, via USB. As another example, I/O interface 1070 may communicate with display 1084 via DVI (Digital Visual Interface) or HDMI (High-Definition Multimedia Interface), among others. In another instance, I/O interface 1070 may communicate with a device in a wireless fashion (e.g., via IEEE (Institute of Electrical and Electronics Engineers) 802.15, IEEE 802.15.4, ZigBee, Bluetooth, etc.). As an example, I/O interface 1070 may communicate with one or more of keyboard 1080 and pointing device 1082, among others, via IEEE 802.15, IEEE 802.15.4, or Bluetooth, among others.

Turning now to FIG. 10B, an example of computer systems communicatively coupled to a network is illustrated, according to one or more embodiments. As shown, computer systems 1010A-1010N may be coupled to network 1090. In one example, a computer system 1010 may be coupled to network 1090 in a wired fashion. In a second example, a computer system 1010 may be coupled to network 1090 in a wireless fashion. In a third example, a computer system 1010 may be coupled to network 1090 in an optical fashion. For instance, a computer system 1010 may be coupled to network 1090 utilizing fiber optics in data communications. In another example, a computer system 1010 may be coupled to network 1090 in any combination of a wired fashion, a wireless fashion, and an optical fashion, among others. In one or more embodiments, two or more of computer systems 1010A-1010N may implement a distributed computing system.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. One or more non-transitory memory media storing instructions executable by at least one processor and which when executed by at least one processor, cause the at least one processor to execute:
   determining, based at least on a plurality of different performance behavior metrics, a plurality of data throughput values that represent processing throughput of software instances as a plurality of consumer computers interoperate with the software instances;
   determining, based at least on the plurality of data throughput values, relative capacity values of the software instances;
   adapting each machine learning prediction model of a plurality of machine learning prediction models to the relative capacity values of the software instances;
   determining a plurality of correlation coefficients from the plurality of machine learning prediction models and the plurality of data throughput values;
   generating, based on a machine learning prediction model of the plurality of machine learning prediction models, extrapolated data as predicted values;
   determining, from the extrapolated data, a number of computing resources and one or more performance factors for a computing workload;
   identifying one or more transactions impacted by the number of computing resources and the one or more performance factors;
   determining threshold values that impacted the one or more transactions; and
   transmitting the threshold values associated with the performance factors of the software instances to a particular consumer computer among the plurality of consumer computers as a message to modify an attribute of a particular software instance of the software instances that are associated with the particular consumer computer of the plurality of consumer computers.

2. The one or more non-transitory memory media of claim 1, further storing instructions which when executed by the at least one processor, further cause the one or more non-transitory memory media to perform one or more statistical significance tests and determine polynomials of the plurality of machine learning prediction models based on coefficients of the polynomials.

3. The one or more non-transitory memory media of claim 1, further storing instructions which when executed by the at least one processor, further cause the one or more non-transitory memory media to determine effects of changes in the one or more performance factors for generating the extrapolated data.

4. The one or more non-transitory memory media of claim 1, further storing instructions which when executed by the at least one processor, further cause the one or more non-transitory memory media to adapt the machine learning prediction model of the plurality of machine learning prediction models that predict whether addition of additional computing resources is associated with diminishing returns than other machine learning prediction models.

5. The one or more non-transitory memory media of claim 1, further storing instructions which when executed by the at least one processor, further cause the one or more non-transitory memory media to determine the threshold values by executing the machine learning prediction model of the plurality of machine learning prediction models associated with a correlation coefficient of the plurality of correlation coefficients to result in outputting the threshold values associated with the performance factors of the software instances.

6. The one or more non-transitory memory media of claim 1, further storing instructions which when executed by the at least one processor, further cause the one or more non-transitory memory media to execute one or more of an Amdahl prediction model for the plurality of machine learning prediction models include, the one or more of the Amdahl prediction model is programmed to execute a first simulation to evaluate a first effect of the performance factors on the software instances, a Gustafson prediction model that is programmed to execute a second simulation to evaluate a second effect of the performance factors on the software instances, and a universal scalability prediction model that is programmed to execute a third simulation to evaluate a third effect of the performance factors on the software instances.

7. The one or more non-transitory memory media of claim 1, further storing instructions which when executed by the at least one processor, further cause the one or more non-transitory memory media to execute:
   receiving, from the particular consumer computer of the plurality of consumer computers, input data that indicates a change in a particular performance factor of the performance factors of the software instances that affect the plurality of different performance behavior metrics;
   executing the machine learning prediction model of the plurality of machine learning prediction models associated with a correlation coefficient of the plurality of correlation coefficients to result in outputting new threshold values associated with the performance factors of the software instances that affect the plurality of different performance behavior metrics; and
   repeating the transmitting using the new threshold values in a new change of message.

8. The one or more non-transitory memory media of claim 1, further storing instructions which when executed by the at least one processor, further cause the one or more non-transitory memory media to execute:
   receiving, from the particular consumer computer of the plurality of consumer computers, input data that indicates a change in at least one performance factor of the performance factors of the software instances that affect the plurality of different performance behavior metrics;
   executing the machine learning prediction model of the plurality of machine learning prediction models associated with a correlation coefficient of the plurality of correlation coefficients to result in outputting a percentage change of a response time of a transaction based at least on the change in the at least one performance factor of the performance factors of the software instances that affect the plurality of different performance behavior metrics; and
   repeating the transmitting using the percentage change of the response time of the transaction.

9. The one or more non-transitory memory media of claim 1, wherein the software instances are executed via at least one of a virtual machine and a container.

10. The one or more non-transitory memory media of claim 1, further storing instructions which when executed by the at least one processor, further cause the one or more non-transitory memory media to execute:
transmitting instructions for a selection graphical user element that permits modifying the attribute of the particular software instance that is associated with the particular consumer computer when the threshold values are transmitted to the particular consumer computer.

11. A computer-implemented method comprising:
determining, based at least on a plurality of different performance behavior metrics, a plurality of data throughput values that represent processing throughput of software instances as a plurality of consumer computers interoperate with the software instances;
determining, based at least on the plurality of data throughput values, relative capacity values of the software instances;
adapting each machine learning prediction model of a plurality of machine learning prediction models to the relative capacity values of the software instances;
determining a plurality of correlation coefficients from the plurality of machine learning prediction models and the plurality of data throughput values;
generating, based on a machine learning prediction model of the plurality of machine learning prediction models, extrapolated data as predicted values;
determining, from the extrapolated data, a number of computing resources and one or more performance factors for a computing workload;
identifying one or more transactions impacted by the number of computing resources and the one or more performance factors;
determining threshold values that impacted the one or more transactions; and
transmitting the threshold values associated with the performance factors of the software instances to a particular consumer computer among the plurality of consumer computers as a message to modify an attribute of a particular software instance of the software instances that are associated with the particular consumer computer of the plurality of consumer computers.

12. The method of claim 11, further comprising performing one or more statistical significance tests and determining polynomials of the plurality of machine learning prediction models based on coefficients of the polynomials.

13. The method of claim 11, further comprising determining effects of changes in the one or more performance factors for generating the extrapolated data.

14. The method of claim 11, further comprising adapting the machine learning prediction model of the plurality of machine learning prediction models that predict whether addition of additional computing resources is associated with diminishing returns than other machine learning prediction models.

15. The method of claim 11, further comprising determining the threshold values by executing the machine learning prediction model of the plurality of machine learning prediction models associated with a correlation coefficient of the plurality of correlation coefficients to result in outputting threshold values associated with the performance factors of the software instances.

16. The method of claim 11, further comprising executing one or more of an Amdahl prediction model for the plurality of machine learning prediction models include, the one or more of the Amdahl prediction model is programmed to execute a first simulation to evaluate a first effect of the performance factors on the software instances, a Gustafson prediction model that is programmed to execute a second simulation to evaluate a second effect of the performance factors on the software instances, and a universal scalability prediction model that is programmed to execute a third simulation to evaluate a third effect of the performance factors on the software instances.

17. The method of claim 11, further comprising:
receiving, from the particular consumer computer of the plurality of consumer computers, input data that indicates a change in a particular performance factor of the performance factors of the software instances that affect the plurality of different performance behavior metrics;
executing the machine learning prediction model of the plurality of machine learning prediction models associated with a correlation coefficient of the plurality of correlation coefficients to result in outputting new threshold values associated with the performance factors of the software instances that affect the plurality of different performance behavior metrics; and
repeating the transmitting using the new threshold values in a new change of message.

18. The method of claim 11, further comprising:
receiving, from the particular consumer computer of the plurality of consumer computers, input data that indicates a change in at least one performance factor of the performance factors of the software instances that affect the plurality of different performance behavior metrics;
executing the machine learning prediction model of the plurality of machine learning prediction models associated with a correlation coefficient of the plurality of correlation coefficients to result in outputting a percentage change of a response time of a transaction based at least on the change in the at least one performance factor of the performance factors of the software instances that affect the plurality of different performance behavior metrics; and
repeating the transmitting using the percentage change of the response time of the transaction.

19. The method of claim 11, further comprising transmitting instructions for a selection graphical user element that permits modifying the attribute of the particular software instance that is associated with the particular consumer computer when the threshold values are transmitted to the particular consumer computer.

* * * * *